US007800770B2

(12) United States Patent
Nakanishi et al.

(10) Patent No.: US 7,800,770 B2
(45) Date of Patent: Sep. 21, 2010

(54) TEXT/IMAGE DATA TRANSFER METHOD

(75) Inventors: Takashi Nakanishi, Kobe (JP); Kazuyuki Murata, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 1440 days.

(21) Appl. No.: 10/483,818

(22) PCT Filed: Jul. 12, 2002

(86) PCT No.: PCT/JP02/07135

§ 371 (c)(1), (2), (4) Date: Jan. 15, 2004

(87) PCT Pub. No.: WO03/008196

PCT Pub. Date: Jan. 30, 2003

(65) Prior Publication Data

US 2004/0169880 A1 Sep. 2, 2004

(30) Foreign Application Priority Data

Jul. 16, 2001 (JP) ............................. 2001-215710
Nov. 5, 2001 (JP) ............................. 2001-338967

(51) Int. Cl.
*G06F 3/12* (2006.01)
(52) U.S. Cl. ............... 358/1.15; 358/403; 709/203; 709/219
(58) Field of Classification Search .............. 395/114, 395/614; 358/1.12, 1.16, 1.15, 402, 1.14, 358/403, 1.18; 709/203, 219
See application file for complete search history.

(56) References Cited

U.S. PATENT DOCUMENTS

| | | | | |
|---|---|---|---|---|
| 5,410,672 A * | 4/1995 | Sodek et al. | ................. | 710/52 |
| 5,594,860 A * | 1/1997 | Gauthier | ..................... | 345/543 |
| 5,634,124 A * | 5/1997 | Khoyi et al. | ............. | 707/103 R |
| 5,970,219 A * | 10/1999 | Nakamura | ................. | 358/1.15 |
| 6,012,090 A * | 1/2000 | Chung et al. | ................ | 709/219 |
| 6,166,826 A * | 12/2000 | Yokoyama | ................. | 358/1.16 |
| 6,867,873 B1 * | 3/2005 | Han | .......................... | 358/1.12 |
| 7,145,674 B2 * | 12/2006 | Hayes | ....................... | 358/1.15 |
| 7,271,924 B1 * | 9/2007 | Takamizawa et al. | ...... | 358/1.14 |
| 7,321,443 B2 * | 1/2008 | Berkema et al. | .......... | 358/1.16 |

(Continued)

FOREIGN PATENT DOCUMENTS

EP    1008941 A2    6/2000

(Continued)

*Primary Examiner*—King Y Poon
*Assistant Examiner*—Jamares Washington
(74) *Attorney, Agent, or Firm*—McDermott Will & Emery LLP

(57) ABSTRACT

When performing Push-type data transfer from the side of an image-supply apparatus 100 to a printer 200P, it is necessary for the printer 200P to have a buffer that is capable of containing at least the capacity for one page of data. Therefore, the text/image-supply apparatus 100 stores printing-description data obtained from the application on its own memory unit 105. The image-formation apparatus 200 performs rasterization based on received printing-description data, however, in this process, when there is a link file L that is linked to the top file T of the printing-description data, the image-formation apparatus 200 specifies the link destination and sends a data-acquisition request to the text/image-supply apparatus 100, so there is no need for a buffer.

12 Claims, 24 Drawing Sheets

U.S. PATENT DOCUMENTS

| | | | |
|---|---|---|---|
| 2002/0015171 A1* | 2/2002 | Tsunekawa | 358/1.13 |
| 2003/0142352 A1* | 7/2003 | Matsunaga et al. | 358/1.15 |

FOREIGN PATENT DOCUMENTS

| | | | |
|---|---|---|---|
| JP | 9-269873 A | 10/1997 |
| JP | 11-283006 A | 10/1999 |
| JP | 11-353146 A | 12/1999 |
| JP | 200-066867 | 3/2000 |
| JP | 2000-158757 A | 6/2000 |
| JP | 2000-181647 A | 6/2000 |
| JP | 2000-181674 A | 6/2000 |
| JP | 2000-250727 A | 9/2000 |

* cited by examiner

FIG.7

```
<?XML VERSION="1.0" ENCODING="UTF-8"?>
<!DOCTYPE HTML PUBLIC "-//W3C//DTD XHTML 1.0 STRICT//EN" "HTTP://WWW.W3.ORG/TR/XHTML1/DTD/XHTML1-STRICT.DTD">
<HTML XML:LANG="EN" XMLNS="HTTP://WWW.W3.ORG/1999/XHTML">
<HEAD>
<META NAME="GENERATOR" CONTENT="HTML TIDY, SEE WWW.W3.ORG" />
<TITLE>MODULARIZATION OF XHTML</TITLE>
<LINK REL="STYLESHEET" TYPE="TEXT/CSS" MEDIA="SCREEN" HREF="XHTML.CSS" />
<LINK REL="STYLESHEET" TYPE="TEXT/CSS" MEDIA="SCREEN" HREF="HTTP://WWW.W3.ORG/STYLESHEETS/TR/W3C-REC.CSS" />
<?XML-STYLESHEET HREF="XHTML.CSS" TYPE="TEXT/CSS" MEDIA="SCREEN" ?>
<?XML-STYLESHEET HREF="HTTP://WWW.W3.ORG/STYLESHEETS/TR/W3C-REC.CSS" TYPE="TEXT/CSS" MEDIA="SCREEN" ?>
<LINK REL="NEXT" TYPE="TEXT/HTML" HREF="INTRODUCTION.HTML" />
</HEAD>
<BODY>
<DIV CLASS="NAVBAR">
<HR />
</DIV>

<DIV CLASS="HEAD">
<A HREF="HTTP://WWW.A_MOTOR.CO.JP/"> <IMG SRC="./CAR.JPG" ALT="COMPANY A'S AUTOMOBILE " /> </A>
<H1><A NAME="TITLE1" ID="TITLE1"></A> COMPANY A'S AUTOMOBILE </H1>

<A HREF="HTTP://WWW.A_CUP.CO.JP/"> <IMG SRC="./CUP.JPG" ALT="MANUFACTURER A'S TROPHY " /> </A>
<H1><A NAME="TITLE2" ID="TITLE2"></A> MANUFACTURER A'S TROPHY </H1>

<DL>
<DT>THIS VERSION:</DT>

FIRST JOB

| | |
|---|---|
| JOB ID | : JOB000001 |
| PATH (URI) | : /USR/SPOOL/JOB000001/PRINT1.XML |
| STATUS | : PRINTING IN PROGRESS |
| QUANTITY | : 1 |
| SIDE | : SINGLE SIDE |
| ORIENTATION | : LANDSCAPE |
| PAPER SIZE | : A4 |
| PAPER QUALITY | : NORMAL PAPER |
| PRINTING QUALITY | : NORMAL |
| MONOCHROME/COLOR | : MONOCHROME |
| ⋮ | |
| NEXT | : SECOND JOB DATA ADDRESS |

SECOND JOB

| | |
|---|---|
| JOB ID | : JOB000002 |
| PATH (URI) | : /USR/SPOOL/JOB000002/PRINT2.XML |
| STATUS | : WAITING FOR PROCESSING |
| QUANTITY | : 3 |
| SIDE | : SINGLE SIDE |
| ORIENTATION | : LANDSCAPE |
| PAPER SIZE | : A4 |
| PAPER QUALITY | : NORMAL PAPER |
| PRINTING QUALITY | : HIGH QUALITY |
| MONOCHROME/COLOR | : COLOR |
| ⋮ | |
| NEXT | : THIRD JOB DATA ADDRESS |

THIRD JOB

| | |
|---|---|
| JOB ID | : JOB000003 |
| PATH (URI) | : /USR/SPOOL/JOB000003/PRINT3.XML |
| STATUS | : WAITING FOR PROCESSING |
| QUANTITY | : 1 |
| SIDE | : SINGLE SIDE |
| ORIENTATION | : PORTRAIT |
| PAPER SIZE | : A4 |
| PAPER QUALITY | : NORMAL PAPER |
| PRINTING QUALITY | : NORMAL |
| MONOCHROME/COLOR | : MONOCHROME |
| ⋮ | |
| NEXT | : NULL (END) |

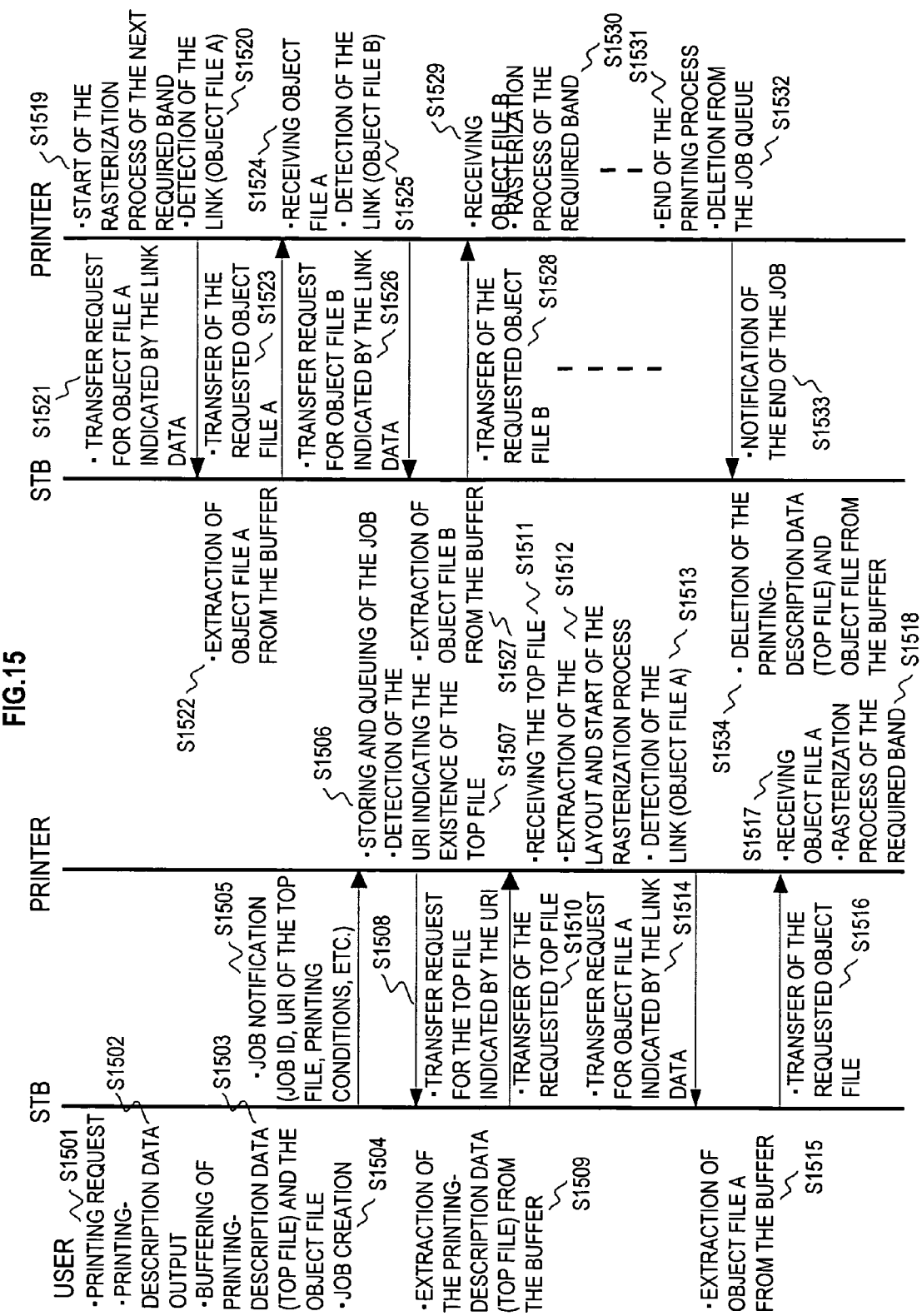

SOLID LINE: PULLING

DASHED LINE: WAITING OR BACKGROUND PULLING

FIG.17

| CHANNEL | OBJECT DATA |
|---------|-------------|
| PORT A  | CAR.JPG     |
| PORT B  | CUP.JPG     |

FIG.18

| | |
|---|---|
| JOB1 | OBJECT 1 : CAR.JPG<br>OBJECT 2 : CUP.JPG |
| JOB2 | OBJECT 1 : CAR-A.JPG |
| JOB3 | OBJECT 1 : CAR-B.JPG<br>OBJECT 2 : CUP-B.JPG<br>OBJECT 2 : CAN-B.JPG |

TEXT/IMAGE DATA TRANSFER METHOD

TECHNICAL FIELD

This invention relates to an image-data transfer method, image-formation apparatus and image-printing system, and more particularly to an image-data transfer method, image-formation apparatus and image-printing system that are connected by a LAN.

BACKGROUND ART

Conventionally, markup language ML such as hypertext in which a tag indicating format and the like is added to text is displayed on a computer display using browser software. XHTML (Extensible Hyper text Markup Language), HTML and XML (Extensible Markup Language) are examples of markup language ML. Files that are written using this markup language ML are mainly stored on a Web server, and browser software that is connected to the Web server via various networks acquires the markup language ML and interprets that markup language ML and displays it on a display or prints it.

In the following explanation, a file that is written using this kind of markup language ML is used in image reproduction such as printing, so hereafter data written in this markup language ML and object data that are linked from that data are called printing-description data. This printing-description data comprises: top data, which is the highest order data in the hierarchical structure that determines the skeletal form or the layout of the printed object; and link data (object data), which is linked to the top data.

Next, a printer apparatus and system configuration for performing specified printing on a recording medium using this printing-description data will be explained with reference to FIG. 23.

FIG. 23 is a schematic diagram of one example of a prior push model. When the printing-description data edited in markup language ML is output from application 11 according to a printing request from the application 11, the printing-description data is further converted by a conversion unit 12 to a language such as XHTML format that can be read by the printer and then input to a printer-control unit 13. Of course, in the case that the data is already in a language that can be read by the printer, conversion does not need to be performed.

In this way, the printer-control unit 13 gives the received printing-description data to a printing-data-conversion unit 16, and here it is converted to data that can be printed as is by the printer, and then it is laid out in a printing buffer 11.

In other words, the printing-description data edited in markup language ML comprises: a top file portion, which is the highest layer that determines the skeletal structure of the overall printed object, and a link file portion (including other files that are further linked to the link file), which is the lower layer of the top file. Here, a printing object that can be drawn directly from the top file is developed as is at the instructed location, and the link file obtains the data of the link destination, which is then developed at the location instructed by the printing-description data. That is, here the data is already put into a form that is the same as the printed form.

After the printing-description data have been laid out, the printer-control unit 13 outputs a job ID that identifies the data to be printed together with a print instruction (printing job) to the job queue 14. This printing job is interpreted by an interpreter 23 of a printer 200P via a network, and then according to an instruction from the interpreter 23, the data that has been laid out in a printing buffer 15 as described above is stored temporarily in the memory 26. After waiting for a specified amount of data, for example one page of data, to be stored in this memory 26, the interpreter 23 that received the printing job gives the necessary amount of data that are laid out in the memory 26 to a rasterizer 24. By doing this, the printer engine 21 is ready to print the printing-description data on the recording medium.

Moreover, FIG. 24 is a drawing showing an example of prior art that is different than that described above. Here, the printing-control unit 13 does not store the data in the printing buffer 15 in the same form as the printed form, but rather stores the top file and link file that is linked to it as separate files. After this storage process is finished, the printing-control unit 13 issues the printing job and activates the interpreter 23, while at the same time stores the top file and link file that are stored in the printing buffer 15 in a buffer 26 on the side of the printer. The top file and link file that is linked to it that are stored in the buffer 26 on the side of the printer in this way are converted to readable data by a conversion unit 27 and then laid out according to layout data by the interpreter 23 and rasterizer 22 and then printed.

The printer apparatus disclosed in Japanese unexamined patent publication No. 2000-66867 is constructed such that link-destination data (for example a URL), which is written in the top data, is stored in advance on the side of the printer in order to save time when the link-destination is fixed and when data is printed frequently from the same place.

The construction shown in FIG. 23 is so-called push type method that transfers data to the printer from the image-supply apparatus 100 without taking into consideration the state of the printer 200P, so it is necessary to have a buffer with a storage capacity of at least one page of data on the side of the printer 200P as well as on the side of the image-supply apparatus 100.

Also, the construction shown in FIG. 24 can be applied to either a push-type method or pull-type method, however, similar to the problem that occurs in the push-type method, it is necessary to have a printing buffer with a specified capacity on the printer side, and thus a cost demerit occurs.

DISCLOSURE OF INVENTION

This invention adopts the following means in order to solve the problems mentioned above.

First, this invention is used between a text/image-supply apparatus and image-formation apparatus that are connected by a communication means, and the printing process is presumed to be based on printing-description data that is written in link-file format having a hierarchical structure.

Under the aforementioned presumptions, the text/image-supply apparatus 100 stores printing-description data obtained from the application in its own memory unit 105. Here, when there is an object that is linked to the printing-description data, that object can be copied in the memory unit 105, or it can be stored in a different memory unit 105.

It is sufficient to use the memory unit 105 that the text/image-supply apparatus 100 originally has for that function as the memory unit 105.

In the state described above, the text/image-supply apparatus 100 issues a printing job. In the image-formation apparatus 200 that receives this printing job, a data-transfer-request unit 2053 sends a request to transfer the printing-description data that is stored in the memory unit 105. Based on the printing-description data acquired according to this request, the rasterizer 202 performs the rasterization process. In this rasterization process, when there is a link file L that is linked to the top file T of the printing-description data, a data-acquisition request is sent from the image-formation apparatus 200 to the text/image-supply apparatus 100 specifying that link destination.

Acquisition of this object is performed an arbitrary amount at a time at an arbitrary timing. This arbitrary timing is after the first rasterization process is finished for example. Also, the arbitrary amount can be set by a method of presetting the amount to acquire at one time, and then acquiring that amount each successive time, for example, or the acquisition amount can be calculated and set for each rasterization by the data-acquisition unit 2054 from the limited amount that can be rasterized at one time in the rasterization process. In either case, the specified amount is acquired starting from the position at the end of the previous acquisition.

When there is a plurality of objects in the printing-description data, it is preferable that channels corresponding to the objects be set on the transmission path. By doing so transfer becomes possible for each object, and control becomes simple, however it is not absolutely necessary to do this.

The hard disc of a set-top box, or the memory card of a digital still camera can be used as the memory unit on the side of the text/image-supply apparatus.

With this construction, it is not necessary to have a memory such as a hard disc on the side of the image-formation apparatus.

BRIEF DESCRIPTION OF DRAWINGS

FIG. 7 is a detail diagram of the printing-description data.

FIG. 14 is a diagram showing a queuing state for a job in the third embodiment.

FIG. 15 is a diagram showing a flowchart for the third embodiment.

FIG. 17 is a diagram showing the relationship between the ports and the files to be transferred.

FIG. 18 is a diagram showing the relationship between the jobs and objects in the third embodiment.

BEST MODE FOR CARRYING OUT THE INVENTION

Embodiment 1

Figure 1:
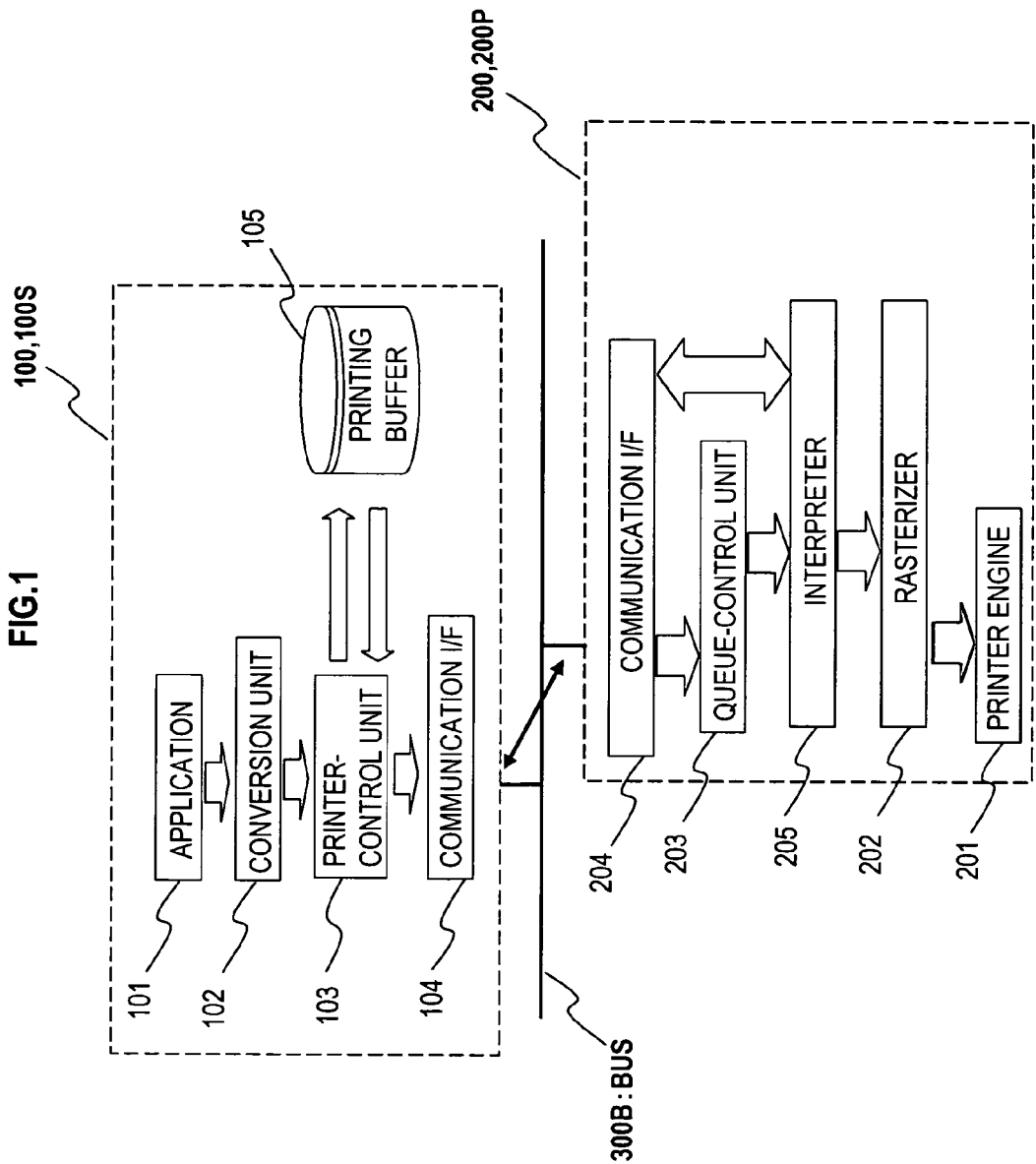
FIG. 1 is a block diagram showing an embodiment of the invention.
Figure 2:
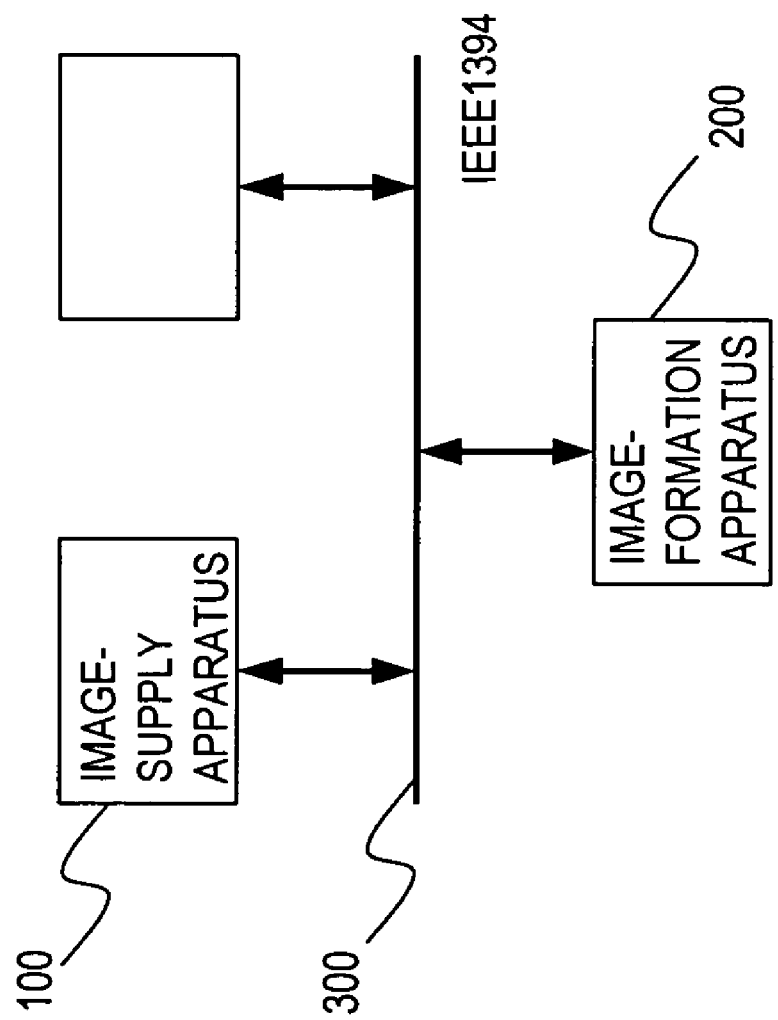
FIG. 2 is a block diagram showing one example of the network environment to which the invention is applied.

FIG. 1 is a block diagram showing an example of the construction of the printing system to which the invention is applied, and FIG. 2 is a diagram of the network to which the system is applied.

In FIG. 2, a text/image-supply apparatus 100 and image-formation apparatus 200 are connected together via a communication means 300. A digital television or set-top box (STB) can be used as the text/image-supply apparatus 100, and it is also possible to use any other kind of device that is a data source. Also, a printer or facsimile machine can be used as the image-formation apparatus 200. Furthermore, a means capable of transferring data such as a bus, public network, dedicated line, Internet network or the like can be used between a computer and the printer as the communication means 300.

Figure 9:
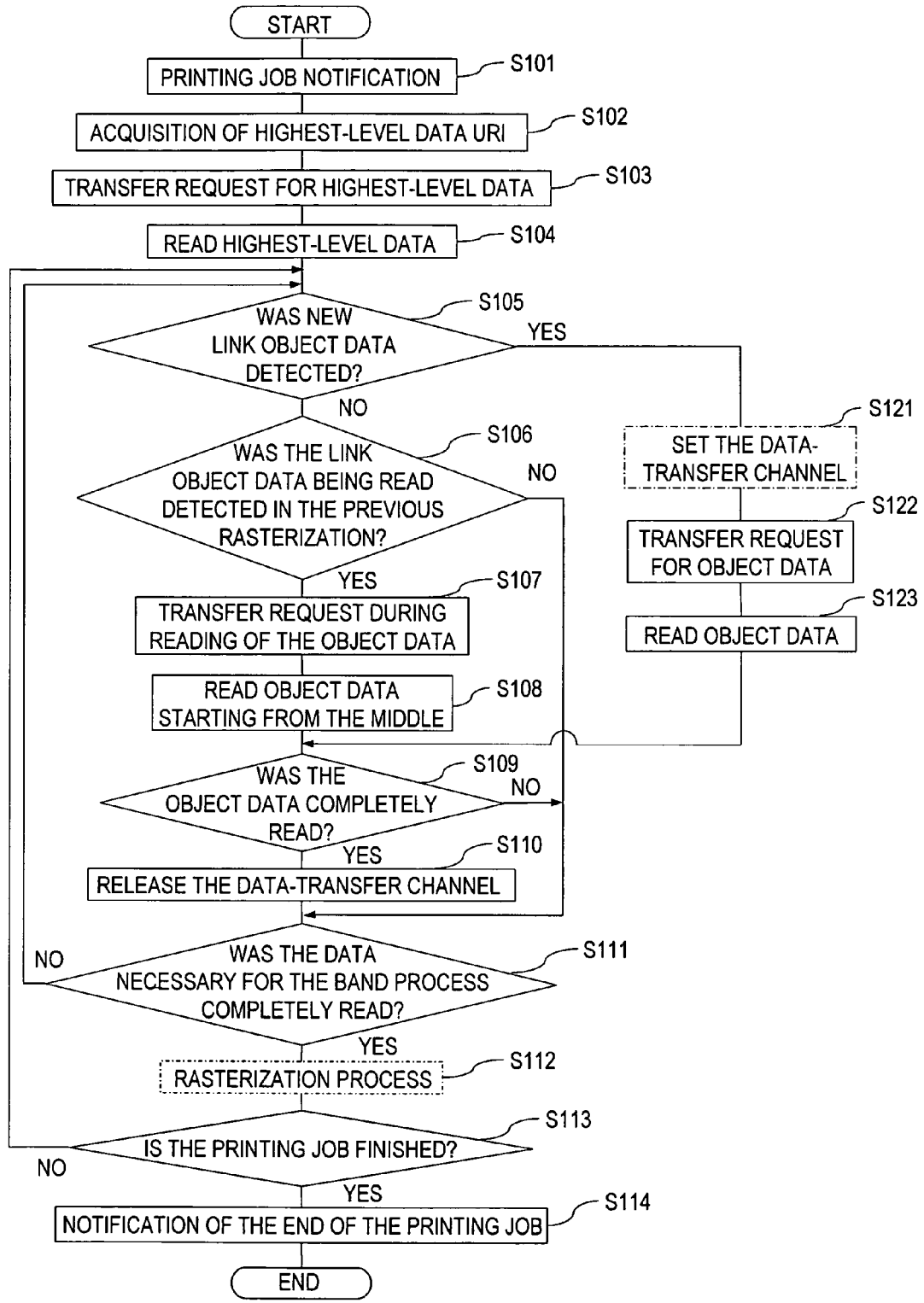
FIG. 9 is a flowchart showing the operating procedure of this invention.

FIG. 1 shows the internal construction in the case where a bus 300B (here an IEEE 1394 bus or a bus complying to USB standards) is used as the communication means 300, a set-top box (STB) 100S is used as the text/image-supply apparatus 100, and a printer 200P is used as the image-formation apparatus 200, and FIG. 9 is a flowchart showing the operating procedure. In FIG. 9, it is presumed that it is possible to set a plurality of channel in the transfer path between the text/image-supply apparatus 100 and the image-formation apparatus 200.

As shown in FIG. 1, the text/image-supply apparatus 100 comprises the following units. That is, the text/image-supply apparatus 100 comprises: an application 101 that generates printing-description data; a conversion unit 102 that converts the format of the printing-description data output from the application 101 into a link-file format (here XHTML will be used) having a hierarchical structure that can be read by a printer 200P; a printer-control unit 103 that reads the printing-description data and issues a printer job, and controls the buffer for the printing-description data; a printing buffer 105 the temporarily stores the printing-description data; and a communication I/F 104, which is the interface that connects to the bus 300B.

Also, the inside of the printer, which is the image-formation apparatus 200, comprises: a communication I/F 204 that is the interface for connecting to the bus 300B; a queue-control unit 203 that is the control unit of the queue that stores the printer job; an interpreter 205 that reads the interprets the printing-description data and gives the data to the rasterizer; a rasterizer 202 that performs rasterization based on the printing data obtained from the interpreter 205; and a printer engine 201 that visibly outputs and records the rasterized printing-description data on a recording medium. In this embodiment, the printer engine 201 is used to visibly output and record the printing-description data on a recording medium, however, this printer engine can also be used as the printer engine in an electronic photo image recording apparatus of an ink-jet type, thermal-transfer type, or laser printer, or used in a silver-chloride photo printer, or in a printing apparatus that creates and image-set copy for screen printing.

In the construction above, first, when the user uses the application for example to send a printing request after editing the printing data, the printing-description data is output from the application 101. This application 101 can be a mailer, WEB browser, BML browser, DSC album that is capable of editing data of a digital-still camera, or the like. Depending on the layout, the data from these is laid out again, and the conversion unit 102 further converts the data to a language that can be interpreted on the printer side, such as XHTML format (in the case that it is already in XHTML format, the data does not need to be converted and this can be omitted).

In this way, the converted printing-description data is given to the printer-control unit 103, and then stored in the printing buffer 105. At this time, files, such as image object files in the printing-description data that are linked, are converted to data in a format (JPEG or PNG format) that can be processed by the printer, and then copied from the source where the data originated to the printing buffer 105. The source can be located inside or outside the text/image-supply apparatus 100. Of course, here also, when there is data that is already in the format that can be processed by the printer, it is not necessary to perform conversion.

The memory or HDD of the text/image-supply apparatus 100 can be used for this printing buffer 105. For example, in the case that the text/image-supply apparatus 100 is a set-top box, it is possible to use the memory unit such as a HD that is originally equipped for the function of the set-top box.

Figure 5:
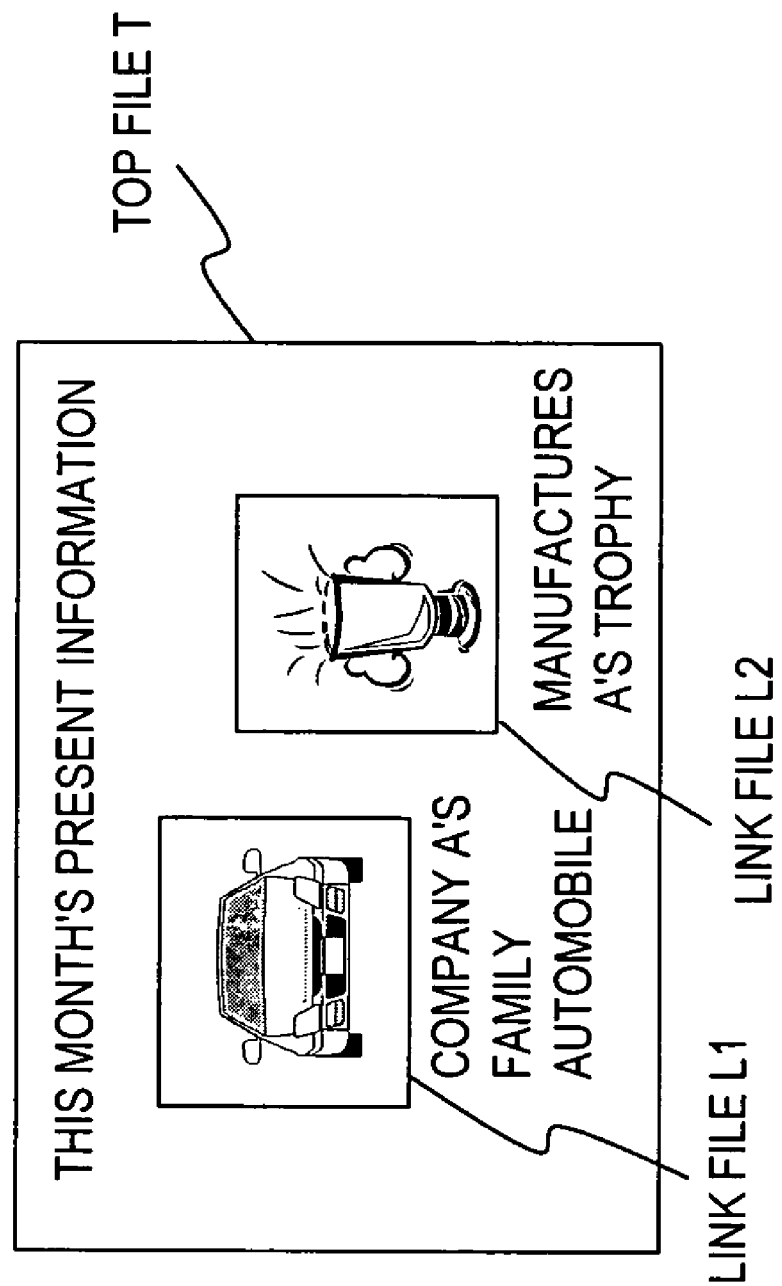
FIG. 5 is a drawing showing an example of an image to which the invention is applied.

In the case of trying to print image data as shown in FIG. 5, the image data is converted to a language that can be displayed by the printer (here this is XHTML format or so called ML format) as shown in FIG. 7, and then stored in the printing buffer 105. When showing the example in FIG. 7 conceptually, it is as shown in FIG. 6.

Figure 6:
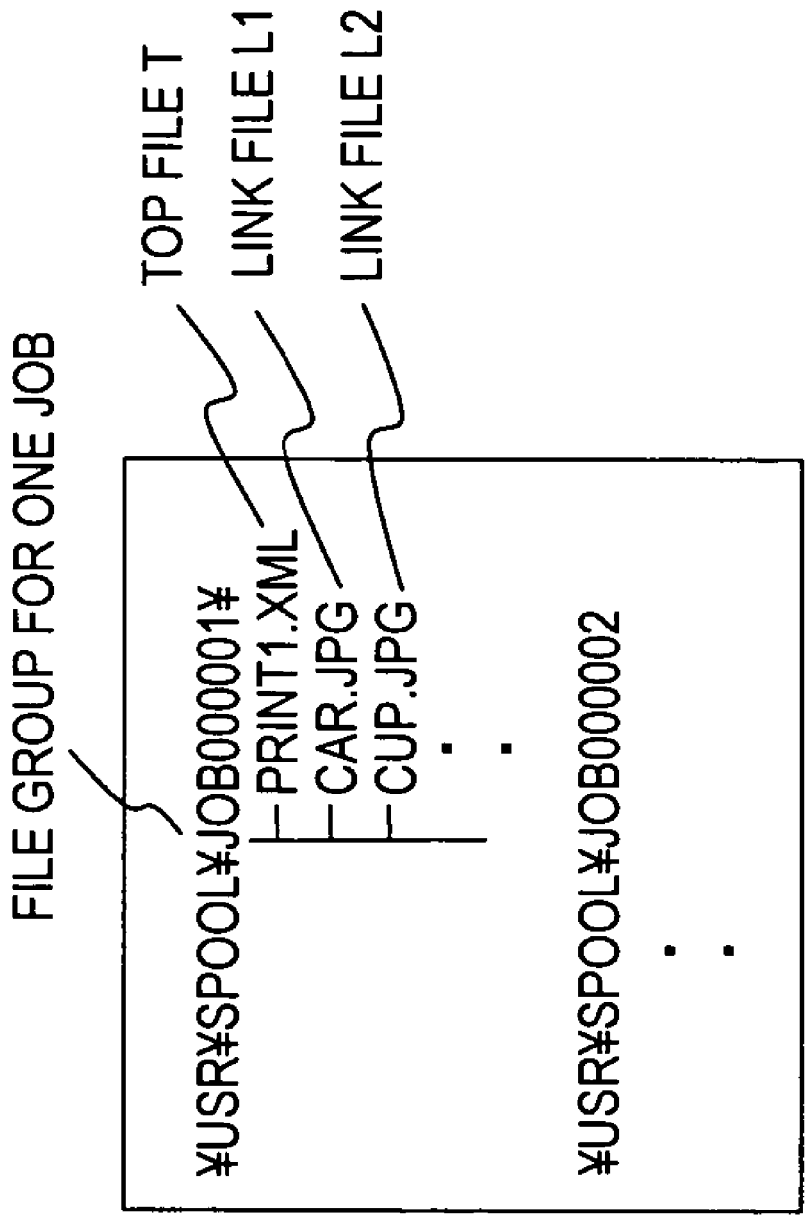
FIG. 6 is a concept drawing of the printing-description data used in this invention.

In FIG. 6, the top file T, 'print1.xml', means all of FIG. 7, and includes the data such as the location of the image, the location and size of the text, or the text that should be printed.

Link file L1, 'car.jpg', means the image of company A's automobile that is stored in the sub-directory of the printing buffer 105 and is displayed on the 19th line of FIG. 7, and link file L2, 'cup.jpg', means the image of the cup that is stored in the sub-directory of the printing buffer 105 and is displayed on the 22nd line of FIG. 7. The name of the sub-directory of the printing buffer 105 can be code that uniquely corresponds to the printing job, for example it can be the same as the job ID.

Also, the printer-control unit 103 performs the process of storing the data in the printing buffer 105, and when it receives the printing request output by the application 101, it issues the printing job to the printer 200P that in addition to the job ID includes printing conditions (for example, number of prints, printing quality, color instructions, printing orientation, format, etc.)(FIG. 9, step S101).

The printing job that is issued in this way is given to the queue-control unit 203 via the I/F 104 and bus 300B. The obtained job is stored in this queue-control unit 203 and the job data is given over to the interpreter 205 in order. The interpreter 205 executes the printing process described below based on the path-information data that indicates the location (URI) in the printing buffer 105 of the printing-description data contained in this printing job.

Figure 3:
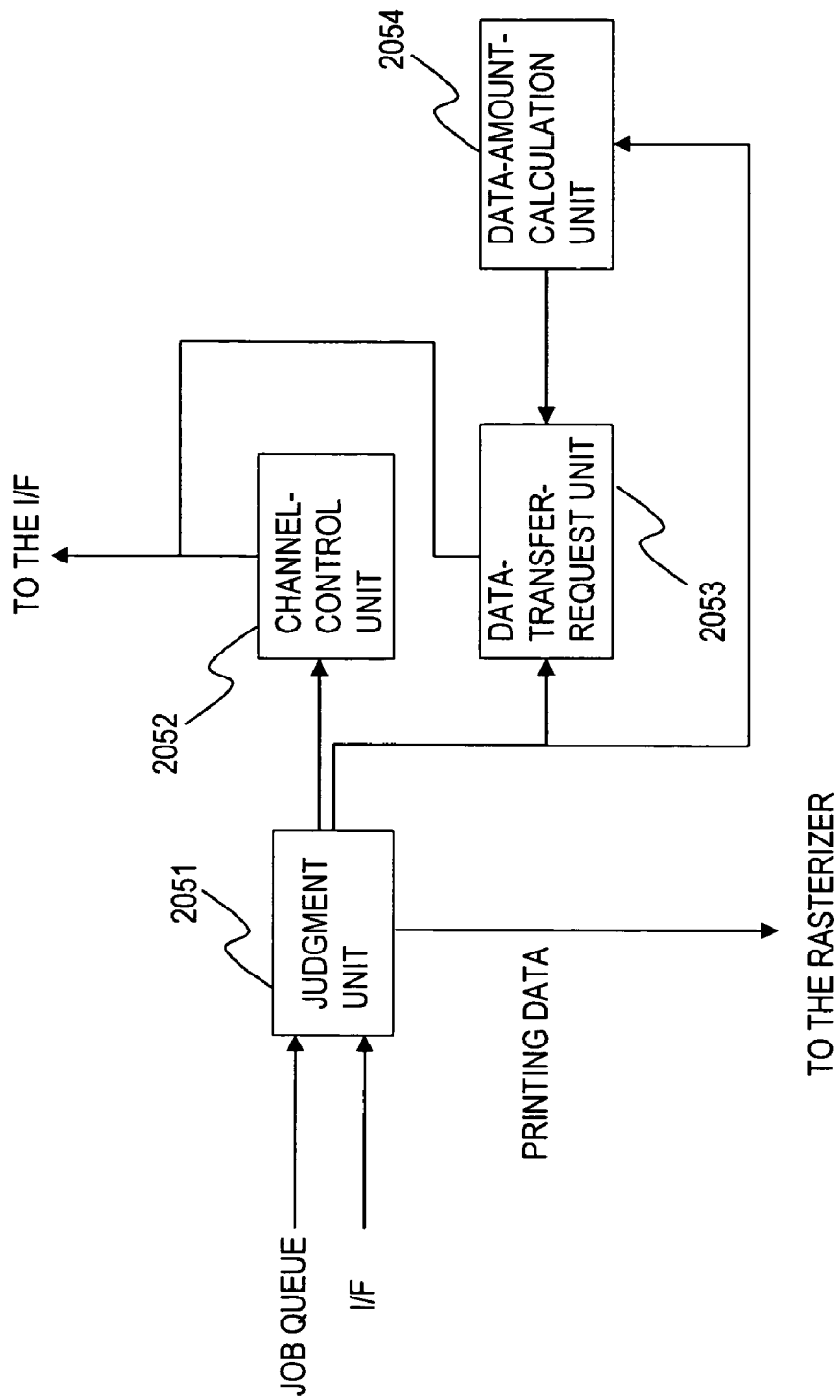
FIG. 3 is a function block diagram showing details of the interpreter.

FIG. 3 is a functional block diagram showing the construction of the interpreter. When the judgment unit 2051 of the interpreter 205 determines that the signal from the queue-control unit 203 is a printing job and path data, it notifies the channel-control unit 2052 of that fact. The channel-control unit 2052 sends an instruction to set a channel in the I/F 204.

The data-transfer-request unit 2053 gives the path data to the printer-control unit 103 via the channel set by that instruction. Also, the data-transfer-request unit 2053 issues an acquisition request to the printer-control unit 103 to acquire the top file T, which is the highest-level data that corresponds to the printing job (FIG. 9, step S102 --> S103).

Following this request, the printer-control unit 103 sends the requested top file T to the interpreter 205 via communication I/F 104 and 204 (FIG. 9, step S104). From this, the interpreter 205 starts reading the printing-description data from the text/image-supply apparatus 100 (FIG. 9, step S104).

The data-transfer request here can be a method of requesting an entire arbitrary file be transferred, or that requests that an arbitrary amount of data from an arbitrary position be transferred (that is, request the data of one file in parts).

The judgment unit 2501 of the interpreter 205 checks the type of printing-description data and discards any unnecessary data, then gives the data to be printed to the rasterizer 202. The rasterizer 202 receives the data to be printed and performs rasterization the data, and the printer engine 201 prints the data on the recording medium.

The judgment unit 2051 detects that a link file L, which is linked to the top file T, is added to the printing-description data as shown in FIG. 7. When it is detected that a link file has been added, the channel-control unit 2052 sends an instruction to the I/F 204 to set another channel that is different than the channel set previously.

As soon as a new channel has been set, the data-request unit 2503 sends a transfer request to transfer the object. This starts the reading of the object data (FIG. 9, step S105, YES --> S121 --> S122 --> S123). The data object is read an arbitrary amount of data at a time, and that value can be preset, or the data-amount-calculation unit 2054 can calculate the necessary amount required at a time for rasterization (FIG. 9, step S111).

Here, when there is a plurality of object files as shown in FIG. 5, the aforementioned amount of data is read to the rasterizer 202 for each object file.

In this process, when the amount of data of the object file that is read first reaches the aforementioned amount, transfer stops at that instant and the rasterization process is performed (step S112).

As soon as this rasterization process ends and the next data becomes necessary, data begins to be transferred starting from the next position in the printing buffer after the position where the previous transfer stopped (FIG. 9, step S106, NO --> S107 --> S108). Also, at the instant when reading ends for one object, the set channel is released (FIG. 9, step S109, YES -->S110). Moreover, when all of the printing job is finished, a printing-complete notification is sent to the printing-control unit 103 (FIG. 9, step S113 --> S114).

Figure 8:
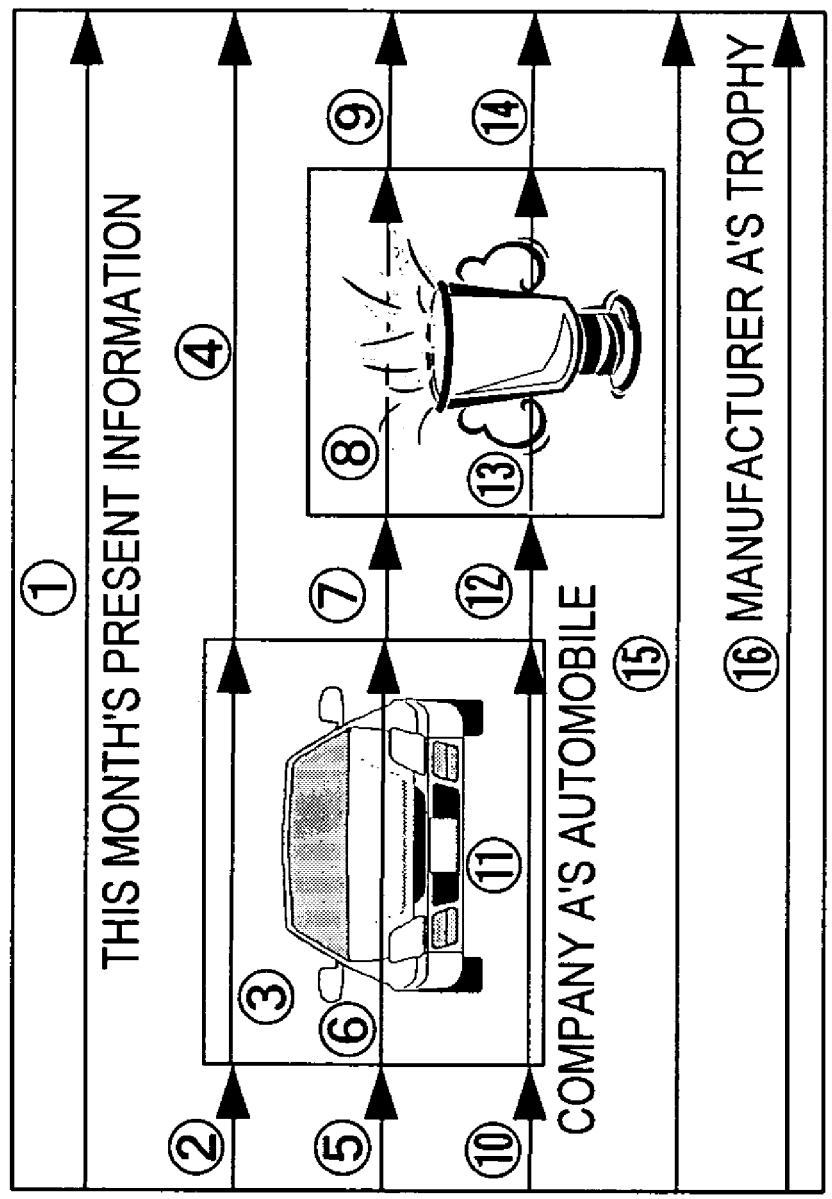
FIG. 8 is a diagram explaining the rasterization process of this invention.

FIG. 8 shows this procedure in more detail. The items numbered 1, 2. etc. below correspond to the same numbers in FIG. 8. In this example, an IEEE1394 bus that is capable of using a plurality of channels at the same time is used, so as will be explained below, channels corresponding to a plurality of objects are set, however, it is also possible to transfer data for a plurality of objects on the same channel (same line).
1. Rasterizes the first base data of the highest layer.
2. Rasterizes the second base data of the highest layer.
3. When rasterizing the second base data of the highest layer, detects an object file that is indicated by link data. Sets a separate transfer channel and sends a request to the printing-control unit 103 to transfer the object file, then the printing-control unit 103 that receives this transfers the data of the file from the printing buffer 105. The rasterizer performs the rasterization process based on this data.

4. When transfer of the object file is interrupted, temporarily stops reading and continues rasterizing the second base data of the highest layer.
5. Rasterizes the third base data of the highest layer.
6. When rasterizing the third base data of the highest layer, detects the same object file as in step 3 that is indicated by link data. Using the same procedure for the object file described in step 3, requests the next data of the laid out data and reads and rasterizes the file.
7. When transfer of the object file is interrupted, temporarily stops reading and continues rasterizing the third base data of the highest layer.
8. When rasterizing the third base data of the highest layer, detects an object file that is indicated by link data and that indifferent than that in step 6. Sets a transfer channel that is separate from that in steps 3 and 6, and requests that the data of the object file be transferred, then reads the file and rasterizes it.
9. When transfer of the second object file is interrupted, temporarily stops reading and continues rasterizing the third base data of the highest layer.
10. Rasterizes the fourth base data of the highest layer.
11. When rasterizing the fourth base data of the highest layer, detects an object file that is indicated by link data and that is the same as that in steps 3 and 6. Using the procedure for the object file described in step 6, requests the next data of the laid out data, then reads and rasterizes the file.
12. As soon as the first object file has ended, stops reading and releases the transfer channel. Continues rasterizing the fourth base data of the highest layer.
13. When rasterizing the fourth base data of the highest layer, detects an object file that is indicated by link data and that is the same as that in step 8. Using the procedure for the object file described in step 6, requests the next data of the laid out data, then read and rasterizes the file.
14. As soon as the second object file has ended, stops reading and releases the transfer channel. Continues rasterizing the fourth base data of the highest layer.
15. Rasterizes the fifth base data of the highest layer.
16. Rasterizes the sixth base data of the highest layer.

The first data described above was taken to be path data that indicates the location of the top file T (main XHTML data), however, it is also possible to send the top data (main XHTML data) from the text/image-supply apparatus to the printer from the start, and then gradually request the necessary data of the object files.

The procedure above is repeated and when all of the objects have been properly transferred, the data-transfer-request unit 2053 of the interpreter 205 sends a notification that transfer has ended together with the job ID to the printer-control unit 103 of the text/image-supply apparatus 100. The printer-control unit 103 receives the printing-end data and removes the printing-description data of that job ID that was stored in the printing buffer 105 from the printer buffer 105.

Also, in the case when an error occurs in the printer during printing, the printing job must be deleted when necessary. For example, when the power supplied to the printer is cut off during the printing process, the bus reset mode is set and the printer-control unit 103 of the text/image-supply apparatus receives the bus reset and sends a notification that the connection with the printer has been lost. At the timing when the printer-control unit 103 detects that the connection with the printer has been lost, it can delete the job ID and printing-description data that are stored in the printing buffer.

Furthermore, to avoid having unnecessary data remain when an error in the system occurs, it is possible to have the text/image-supply apparatus 100 delete the job ID and printing-description data in the printing buffer 105 when the power to the text/image-supply apparatus 100 goes from OFF to ON, or when a timer limit operates according to an arbitrarily set value.

As mentioned above, the printing system of this invention is such that when transferring printing-description data using a serial bus connection, control (stopping and re-starting transfer) is performed such that the data is transferred in a format that is readable by the image-formation apparatus, and data is transferred in specified amounts at a time that can be rasterized by the image-formation apparatus.

By doing this, there is no need for a large printing-description data buffer on the side of the printer for spooling, and furthermore it becomes possible to get other data at the timing when it is necessary on the printer side for the printing-description data, and this is advantageous when performing the rasterization process.

Also, on the side of the text/image-supply apparatus only a job needs to be issued and there is no need to perform a queuing process, so it is possible to use the HDD or the like installed inside the apparatus as the spooling buffer.

Embodiment 2

Figure 4:
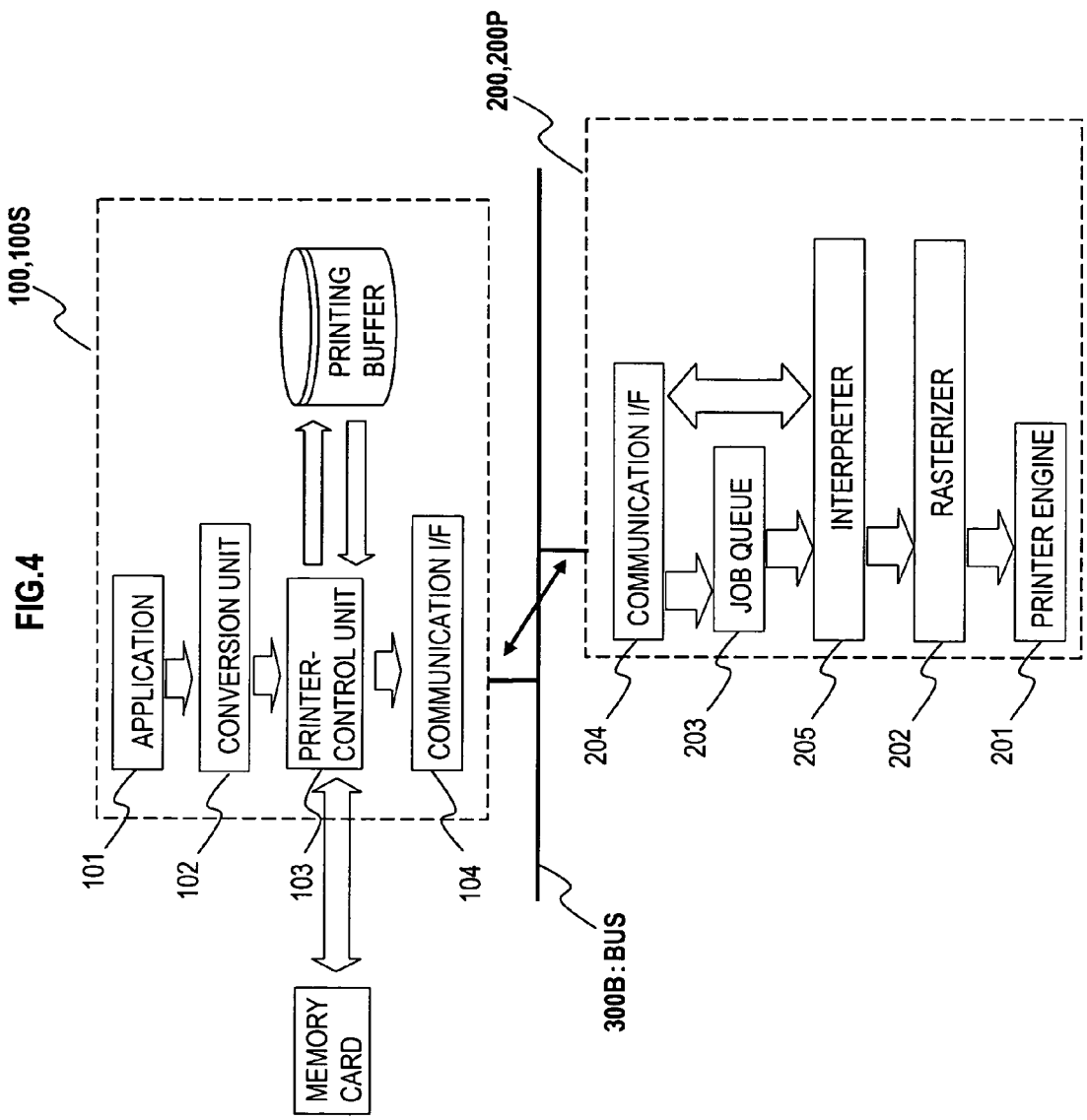
FIG. 4 is a block diagram showing another embodiment of the invention.

FIG. 4 is a functional block diagram showing a second embodiment of the invention. In this embodiment, the text/image-supply apparatus 100 and image-formation apparatus (printer) 200 are connected together by a bus 300B, and the basic construction is the same as in the first embodiment.

However, in this embodiment, in addition to the basic construction of the first embodiment, the text/image-supply apparatus 100 has an external memory I/F 110 (not shown in the figure) to which an external-memory apparatus MC (for example a memory card; a memory card will be used in the explanation below) can be mounted.

This external memory I/F 110 transfers the image data inside the memory card MC to the printer 200P according to a request from the printer-control unit 103 of the text/image-supply apparatus 100.

Here, when a memory card that stores images from a digital still camera is used as the memory card MC, an application 101 that is capable of processing data from a digital still camera (DSC) is of course used as the application 101.

As in the first embodiment, the link destination of a link file L that is written in the top file T is stored as previously explained in the printer buffer 105, and when a printing request is issued, the printing-description data that was output according to the application 101 is stored in the printer buffer 105. Also, image data that is linked to the printing-description data is data that can be printed by the printer 200P and is laid out in the printer buffer 105 from the memory card MC.

However, here, the data stored in the memory card is data that can be processed by the printer 200P such as JPEG data or the like, so in this state, the link destination of a link file that is written in the top file T can be located in a position that corresponds to the object in the memory card.

However, when the data in the memory card MC is a link destination, that data is not deleted even when a notification is sent from the printer side that printing has ended.

With the construction described above, as in the first embodiment, it is possible to use the internal HDD or the like that is installed in the apparatus as the spooling buffer, or it is also possible to use as is an externally connected memory card or the like as the printing buffer. Also, in the text/image-supply apparatus it is sufficient to just create the top data of the printing-description data that contains layout data.

In third, fourth embodiments of the invention to be described below, the rasterization method of text/image data in the first and second embodiments described above will particularly be explained in more detail.

Embodiment 3

Figure 10:
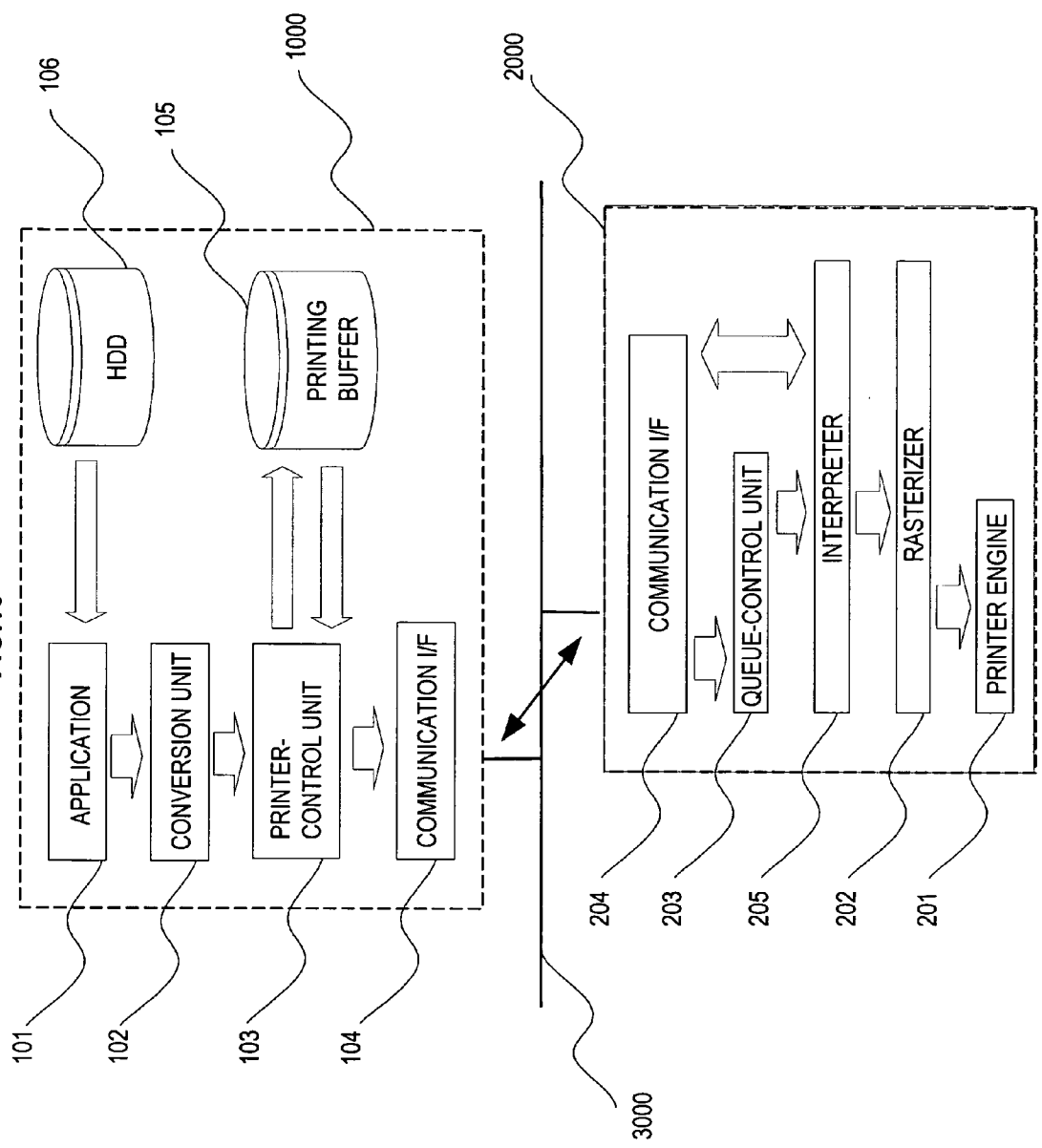
FIG. 10 is a block diagram showing the construction of the printing system of a third embodiment of the invention.
Figure 11:
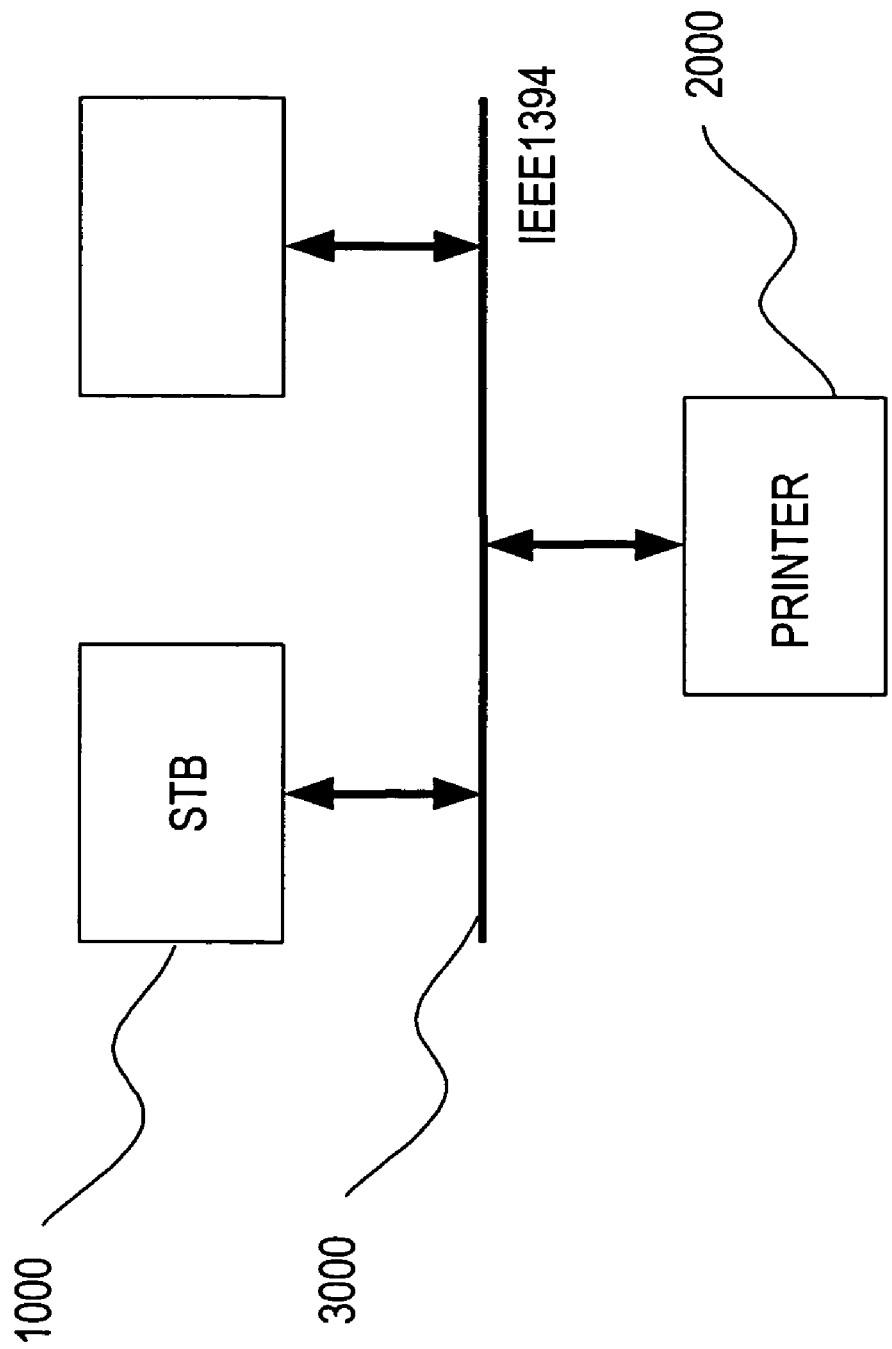
FIG. 11 is a drawing showing the network relationship of the third embodiment.

FIG. 10 is a block diagram showing an example of the construction of the printing system to which the invention is applied, and FIG. 11 is a diagram of the network to which the system is applied.

In FIG. 11, the STB 1000 and printer 2000 are connected together by way of an IEEE1394 bus 3000. A digital TV or set-top box (STB) can be used as the STB 1000, however it is also possible to use any device that can supply text and images. Also, it is also possible to use any device capable of forming text or images, such as a printer or facsimile, as the printer 2000. Furthermore, it is possible to use any means that is capable of transferring data, such as USB, bluetooth (R), public network, dedicated line, Internet network or the like, as the IEEE1394 bus 3000 shown in FIG. 11.

Figure 19:
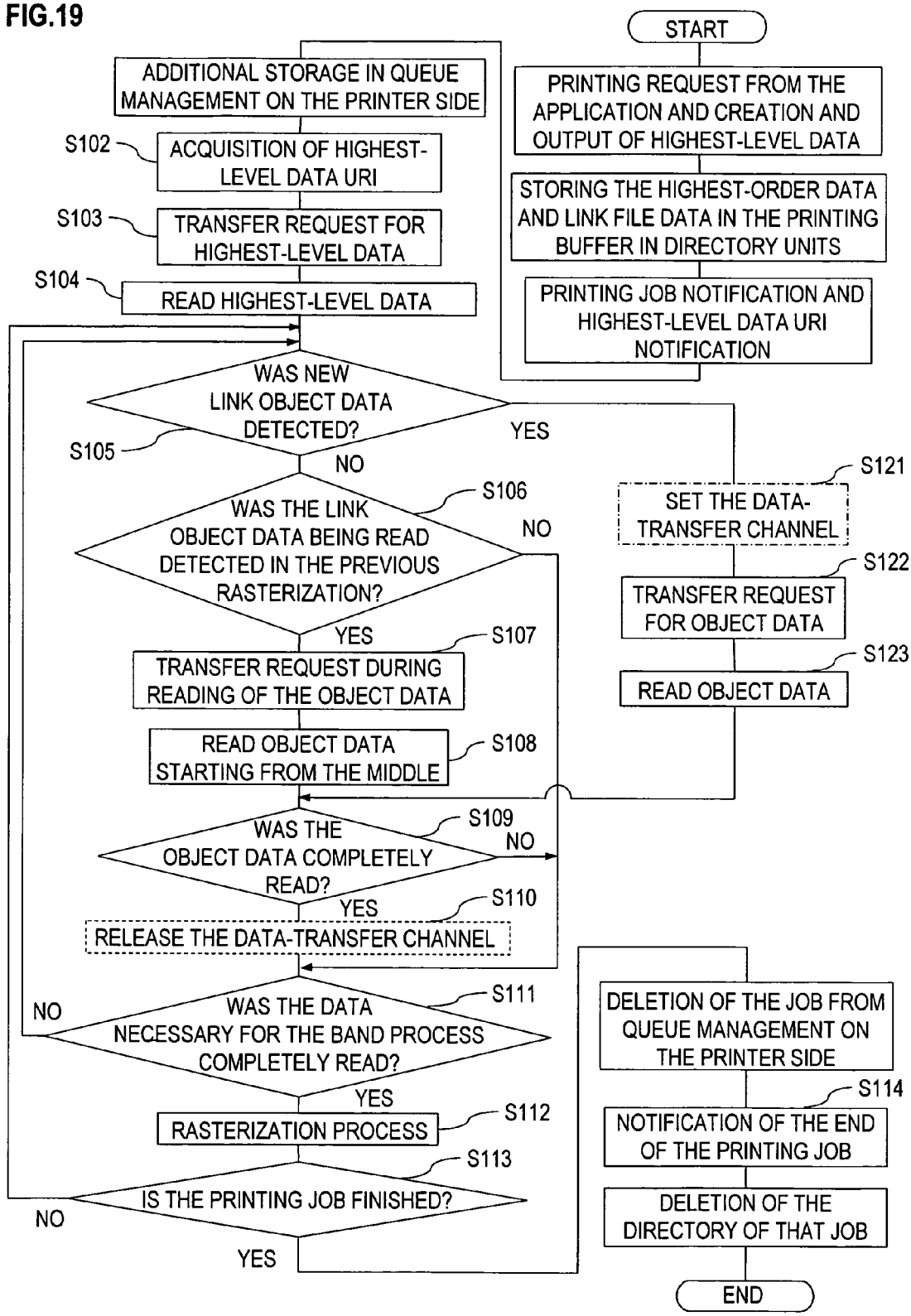
FIG. 19 is a flowchart of the operating procedure of the third embodiment.

FIG. 10 shows the internal construction in the case when an IEEE1394 bus 3000, STB 1000 and printer 2000 are used, and FIG. 19 is a flowchart showing that operating procedure. In FIG. 19, it is possible to set a plurality of channels for the transfer paths between the STB 1000 and printer 2000, and it is presumed that a plurality of individual data is transferred in parallel, however, it is also possible to transfer all data on one channel.

As shown in FIG. 10, the STB 1000 comprises the following units. That is, it comprises: an application 101 that generates the printing-description data; a conversion unit 102 that converts the format of the printing-description data output from the application 101 to printing-description data having a link file format (here, XHTML is used) with a hierarchical structure that can be read by the printer 2000; a printer-control unit 103 that issues printing jobs for printing requests that correspond to the printing-description data and controls the buffer for the printing-description data; a printing buffer 105 that temporarily stores the printing-description data; and a communication I/F 104 that is an interface connecting to the IEEE1394 bus 3000.

Also, the printer, which is the printer 2000, comprises: a communication I/F 204 that is an interface connecting to the IEEE1394 bus 3000; a queue-control unit 203 that is a queue-control unit that stores the printing job; an interpreter 205 that interprets the printing-description data (here it is XHTML data) and gives it to the rasterizer; a rasterizer 202 that performs rasterization based on printing data obtained from the interpreter; and a printer engine 201 that visibly records and outputs the rasterized printing-description data on a recording medium.

With this construction, when the user uses the application to output a printing request after editing printing data, for example, printing-description data is output from the application 101. This application 101 can be a mailer, WEB browser or BML browser, DSC album that can edit data from a digital still camera, or the like. The data is laid out again by a lay outer, and the conversion unit 102 further converts the data to a language, such as XHTML format for example, that can be interpreted on the printer side (of course in this case when the data that is output from the application is already in XHTML format, it is not particularly necessary to perform conversion).

The printing-description data that is converted in this way is then given to the printer-control unit 103 and stored in the printing buffer 105. When doing this, image-object files that are linked in the printing-description data are converted to data (JPEG or PNG format) having a format that can be processed and printed by the printer, and copied from the original source to the printing buffer 105. This source can be either inside or outside of the text/image-supply apparatus 100.

Of course, here also, when the data is already in a format that can be processed and printed by the printer, conversion is not necessary.

The memory or HDD of the STB 1000 can be used as this printing buffer 105. For example, when the STB 1000 is a set-top box or digital television, the memory unit, such as a HDD, that is originally installed in the set-top box or digital television can be used.

Here, when printing image data such as shown in FIG. 5, the data is converted to a language that can be interpreted by the printer as shown in FIG. 7 (here, XHTML format or so-called ML format is used) and stored in the printing buffer 105. FIG. 6 conceptually shows the example of FIG. 7. The diagram shown in FIG. 5, in more detail, comprises the data PRESENT.bml, CAR.jpg and CUP.jpg of FIG. 13A. These data are received by the STB during a data broadcast, and first stored in the HDD 106 shown in FIG. 10.

The printing-description data that is created by the application 101 in this way is further converted by the conversion unit 102 into a language, such as XHTML format, that can be interpreted on the printer side, handled as the top file for one printing request, and stored in the memory unit of the text/image-supply apparatus with the structure shown in FIG. 6.

That is, PRESENT.bml in the data shown in FIG. 13A is converted by the conversion unit 102 to print1.xml shown in FIG. 13B. This print1.xml, as well as the CAR.jpg and CUP.jpg that are saved in the HDD 106 shown in FIG. 10, are saved in the printing buffer 105 shown in FIG. 10. At this time, CAR.jpg and CUP.jpg can be used as is saved in the HDD 106 without being saved in the printing buffer 105, however, when the program changes during data transmission, printing trouble occurs when the data in the HDD disappears, so in that case, it is particularly desirable that all of the data be saved in the printing buffer 105.

In FIG. 6, the top file T 'print1.xml' is data in the highest layer that sets the framework of the entire printing object, and is printing-description data that is edited into markup language ML. Also, the top file T contains the location of images, the location and size of text, text that is to be printed, and the like.

Figure 13:
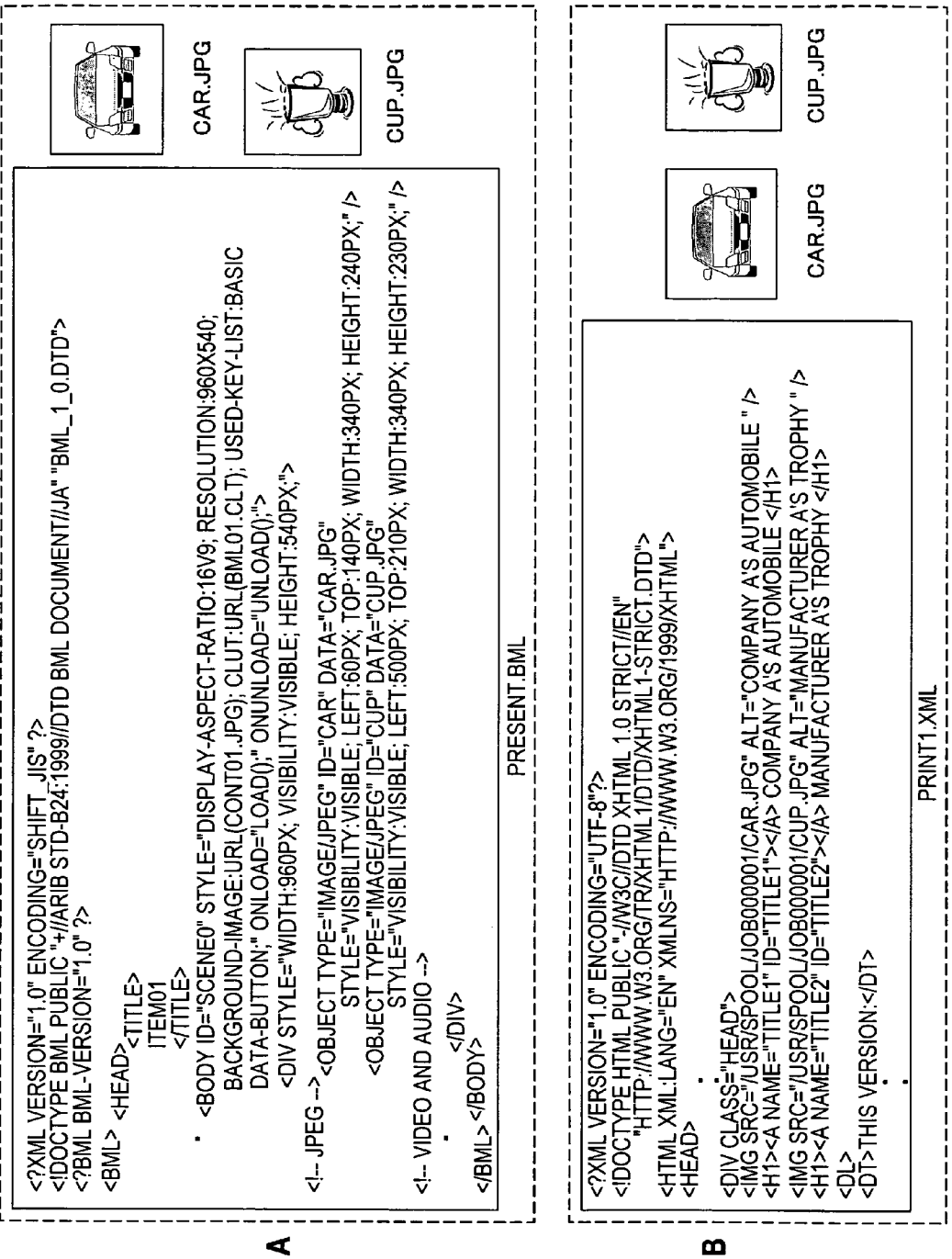
FIG. 13 is a diagram showing a file related to the printing object of the third and fourth embodiments.

The print1.xml file shown in FIG. 13 corresponds to a top file. The link file L1 'car.jpg' is an image of company A's car that is stored in the sub-directory in the printing buffer 105 shown on line 19 in FIG. 7 and, and link file L2 'cup.jpg' is an image of a cup that is stored in the sub-directory in the printing buffer 105 shown on line 22 of FIG. 7. The name of the sub-directory in the printing buffer 105 can be a code that uniquely corresponds to the printing job, for example, it can be the same as the job ID, and it is also further possible to copy each of the files from the source where they are originally saved to the printing buffer 105 and save and store them in the sub-directory.

Also, the printer-control unit 103 performs the aforementioned storage process as well as receives a printing request output by the application 101 and issues a printing job that contains the job ID and printing conditions (for example, number of prints, print quality, color instructions, printing direction, format, etc.) as job data (FIG. 19, step S101).

The printing job that is issued in this way is sent to the queue-control unit 203 via the I/F 104 and IEEE1394 bus 3000. This queue-control unit 203 stores the obtained job, performs queue control, and sequentially sends the job data to the interpreter 205. The interpreter 205, executes the printing process described below based on path data that indicates the location (URI) in the printing buffer 105 where the printing-description data contained in this printing job is located. Besides containing the job ID and printing conditions, the queued job data also contains path information data indicating the location (URI) in the printing buffer 105 where the printing-description data is located, however it does not contain data required for text/image formation (text or image).

Here, FIG. 15 will be used to explain in detail the communication between the STB and printer after the user sends a printing request.

After the user uses the application 101 on the STB and requests that desired data be printed (S1501), the application 101 outputs printing-description data (S1502). The printer-control unit 103 further stores the output printing-description data in the printing buffer 105 (S1503). At the same time, the image object files that are linked in the printing-description data are also copied to the printing buffer 105 (S1503). Furthermore, a set of data containing, printing conditions that were given at the tile of the printing request (number of prints, print quality, color instruction, etc.), an ID given to each printing request for identification, and path data indicating the location (URI) of the printing-description data or top file, is created as job data (S1504).

The STB notifies the printer of the job data (S1505), and when the printer receives the job data the job data is stored and queued by the queue-control unit 203 (S1506).

Next, the printer detects the location (URI) of the top file related to the printing request from the job data (S1507), and based on that location (URI) the printer sends a request to the STB to transfer the top file (S1508). The STB receives the transfer request from the printer to transfer the top file, then extracts and printing-description data stored in the printing buffer 105 as the top file (S1509) and transfers it to the printer (S1510).

When the printer receives the top file that was transferred from the STB (S1511), it starts the process for calculating the layout based on the top file and starts rasterization (S1512).

Next, during rasterization, when the judgment unit 2051 detects an object file A that is linked to the top file (S1513), the printer, by way of the data-request unit 1503, requests that the object file A be transferred (S1514). The STB receives the request from the printer to transfer the object file A, then extracts the object file A that is stored in the printing buffer 105 (S1515) and transfers it to the printer (S1516).

When the printer receives the object file A that is transferred from the STB (S1517), it performs the rasterization process for the necessary band (S1518) and prints the data.

Next, in the printer the rasterization process is performed for the next necessary band (S1519). Here, similar as was done before, during the rasterization process, when the judgment unit 2051 detects the object file A that is linked to the top file (S1520), the printer, by way of the data-request unit 2503, requests that the object file A be transferred. The STB receives the request from the printer to transfer the object file A, then extracts the object file A that is stored in the printing buffer 105 (S1522) and transfers it to the printer (S1523). The printer receives the object file A that is transferred from the STB (S1524), and in this band, when the judgment unit 2051 further detects during rasterization a new object file B that is linked to the top file (S1525), as before, the printer, by way of the data-request unit 2503, requests that the object file B be transferred (S1526).

The STB receives the request from the printer to transfer the object file B, then extracts the object file B that is stored in the printing buffer 105 (S1527) and transfers it to the printer (S1528). When the printer receives the object file B that was transferred from the STB (S1529), it performs the rasterization process for the necessary band (S1530) and prints the data.

The process described is repeated, and when the printing process ends for one job (S1531), the printer deletes the finished job data from the job queuing (S1532), and further notifies the STB that the job has ended (S1533). The STB receives the notification and acknowledges that the job has ended, and deletes the printing-description data (top file) that is copied and stored in the printing buffer 105, and also deletes the image object files that are linked to the printing-description data from the printing buffer 105 (S1534).

As shown in FIG. 14, when there is a plurality of jobs, after one job has ended, processing is performed to connect the jobs (queuing) to move on to the next job.

FIG. 3 is a functional block diagram showing the construction of the interpreter. When the judgment unit 2051 of the interpreter 205 determines that a signal sent from the queue-control unit 203 in this way is a printing job from the path data that indicates the location of the top file contained in that signal, it sends an instruction to the channel-control unit 2052. The channel-control unit 2052 receives that instruction and instructs the I/F 204 to set a channel. By doing this, the data-transfer-request unit 2053 sends the path data to the printer-control unit 103 by way of the set channel, and issues an acquisition request to the printer-control unit 103 to acquire the top file T, which is the highest-layer data that corresponds to the printing job (FIG. 19, step S102 --> S103).

According to this, the printer-control unit 103 sends the requested top file T to the interpreter 205 by way of the communication I/Fs 104, 105 (FIG. 19, step S104). Then the interpreter 205 starts reading the printing-description data from the STB 1000 (FIG. 19, step S104).

The method used here for requesting that data corresponding to the top file T be transferred is a method of indicating the top file, which is the printing object, and requesting that it all be transferred at once. However, in this method, when the amount of data in the top file T becomes large, it places a burden on the transmission path and there is a possibility that it may affect other devices, so a method of requesting an arbitrary amount of data starting from an arbitrary position in the top file is also possible. The method of requesting an arbitrary amount of data could be a method that divides up the data in one file, and requests it in parts. More particularly, in the first request, 10 KB of data starting from the start of the top file is requested, then, in the next request, 10 KB of data starting from a position offset 10 KB from the start is requested.

In addition, the judgment unit 2501 of the interpreter 205 determines the type of the printing-description data and discards any unnecessary data (for example audio data), then gives the data to be printed to the rasterizer 202. The rasterizer 202 that receives the data to be printed in this way rasterizes the data, and the printing engine 201 prints the data on a recording medium.

The judgment unit 2051 detects that a link file L that is linked to the top file T has been added to the printing-description data as shown in FIG. 7. After detecting that a link file L has been added, the channel-control unit 2052 sends an instruction to the I/F 204 to set a different channel than the currently set channel. As soon as the new channel is set, the data-request unit 2503 sends a transfer request to transfer the object. According to this request, reading of the link file as the object file begins (FIG. 19, step S105, YES --> S121 --> S122 --> S123). This object file can be read an arbitrary amount at a time, and that value can be set in advance, or it is possible for the data-amount-calculation unit 2054 to calculate and set the amount of data needed for rasterization at that time (FIG. 19, step S111).

In more detail, rasterization is performed in band units, and the amount of data necessary for the one band is set based on printing conditions, such as the paper size obtained at the time of the printing request. Also, the necessary amount of the object file that is to be processed in one band is calculated based on layout data for the object file that is obtained from the top file T by the judgment unit 2051. Therefore, in the case where the amount of data of the object file that is necessary for one band is 10 KB, for example, it is possible for the printer to request that only 10 KB of the object file be transferred and then transfer is performed one time, or it is possible to transfer 1 KB of data ten times. Also, normally object files such as image data are compressed, so it is possible for the printer to set that 1 KB of data be transferred at one time and perform decompression each time the data is received, and then determine whether or not the amount of data of the object file necessary for one band has been satisfied. If the amount has not yet been satisfied, requests to continue transferring the object file are performed until the necessary amount has been satisfied. With this kind of process, the necessary amount of data is collected as the entire data for one band and rasterization is performed.

Here, as shown in FIG. 13, when there is a plurality of object files, the calculation described above is performed for each object file, and the amount of data necessary for one band-processing unit is read for each file, respectively.

In this process, as soon as the amount of data of the read object file reaches the amount of data necessary for band processing, transfer is temporarily interrupted, and rasterization is performed (FIG. 19, step S112). It is also possible to perform the next transfer process in the background as long as there is enough memory even though transfer is interrupted in this way. After the rasterization process ends and it becomes necessary again in the next rasterization process to transfer the data that had been interrupted, transfer of data begins from the next position in the printing buffer 105 after the position where transfer stopped the previous time (FIG. 19, step S106, NO --> S107 --> S108). Also, as soon as reading of one object is completed, the channel that was set like this is released (FIG. 19, step S109, YES --> S110). Moreover, when all of the printing job is completed, the printing-control unit 103 is notified that printing has ended (FIG. 19, step S113 --> S114).

The general relationship between the printing job and the object is as shown in FIG. 18. That is, each printing job is divided by printing objects, and the data of each printing object corresponds to the object. In the third embodiment, there is one job and two objects.

Figure 16:
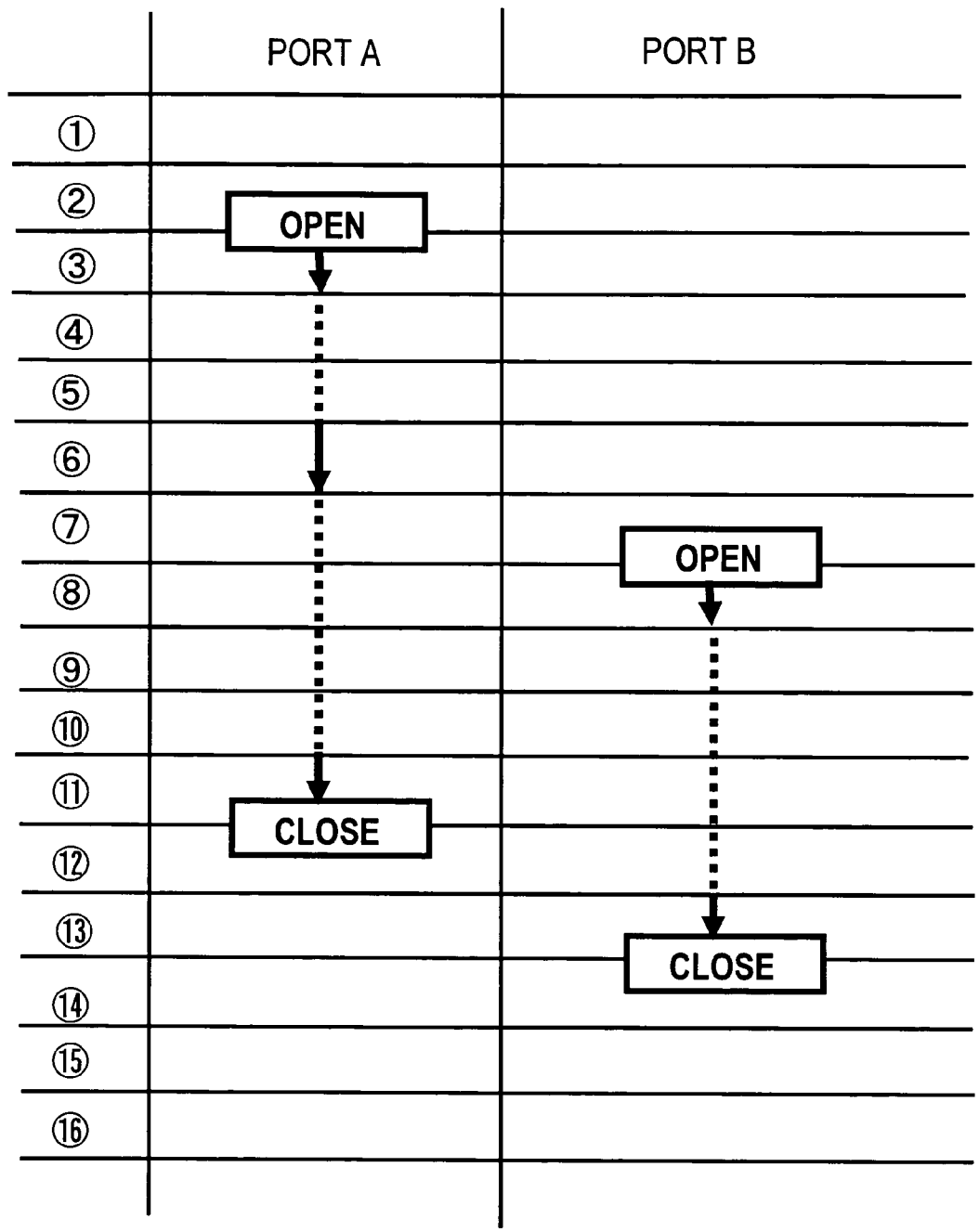
FIG. 16 is a diagram showing the channel use in the third embodiment.

FIG. 8 shows this procedure in more detail. The steps 1, 2 . . . below correspond to the symbols 1, 2 . . . in FIG. 8. In this example, a bus IEEE1394 that is capable of being used by a plurality of channels at the same time is used, so as will be described below, a corresponding channel will be set for each of the plurality of objects, however, of course it is also possible to transfer the data of a plurality of objects using the same channel (same line). Here, it is presumed that the top file has already been read using the procedure described above. When relating the opening and closing of the channel to FIG. 8, the process is as shown in FIG. 16. Furthermore, the relationship between the channel and the file to be transferred is shown in FIG. 17.

1. First, base data (text data) written in the top file of the highest layer is rasterized in the first bandwidth.

2. Rasterization of the base data written in the top file of the highest layer is started in the second bandwidth.

3. An object file (image data) that is indicated by link data is detected during rasterization of base data written in the top file of the highest layer in the second bandwidth. Here, another channel is set and a transfer request to transfer the object file is sent to the printer-control unit 103, then the printer-control unit 103 that received the request transfers the data of the file from the printing buffer 105.

That is, at the same time that the base data is being rasterized (or after the top file has been received) in the second bandwidth, the data-amount-calculation unit 2054 calculates from the layout data of the object the amount of data necessary for rasterization of the object in that bandwidth, then the data-transfer-request unit 2053 sends a transfer request to the printer-control unit 103 to transfer the object file. Normally, an object file of image data is in a compressed format such as JPEG, and in this case the following occurs.

When the data-amount-calculation unit 2054 calculates the necessary amount of data for rasterization of object data (for example 10 KBytes) in that bandwidth, the data-transfer-request unit 2053 performs a transfer request for transferring a preset amount of data (for example 4 KBytes) of the compressed object file. After the transfer process, the data of the transferred object file is expanded, and when the obtained amount of data (for example 7 KBytes) is less than the necessary amount of data for rasterization of the object data in that bandwidth, the process is repeated again. In this way, the transfer request is performed until the necessary amount of data for rasterization of the object data in that bandwidth is reached.

(The rasterizer continues the rasterization process of the object based on this data.)

4. As soon as there is enough data to perform rasterization of the previous object file in the second bandwidth, reading of the object file is temporarily interrupted and the second rasterization of base data written in the top file of the highest layer continues.

5. Rasterization of the base data written in the top file of the highest layer starts in this third bandwidth.

6. The same object file (image data) that is indicated by link data in step 3 is detected during rasterization of base data written in the top file of the highest layer in the third bandwidth. The continuing data of the object file data laid out by the procedure in step 3 is requested and the file is read, then rasterization continues.

7. As soon as there is enough data of the previous object file to perform rasterization in the third bandwidth, reading of the object file is interrupted and the third rasterization of the base data written in the top file of the highest layer continues.

8. An object file (image data) indicated by link data that is different than that in step 6 is detected during rasterization in the third bandwidth of the base data written in the top file of the highest layer. At that time a transfer channel that is different that the one in steps 3 and 6 is established, and transfer of the data of the object file is requested by the same procedure as in step 3 and the file is read, then rasterization continues.

9. As soon as there is enough data of the second object to perform rasterization in the third bandwidth, reading of the object file is temporarily interrupted and the third rasterization of the base data written in the top file of the highest layer continues.

10. Rasterization of base data written in the top file of the highest layer starts in the fourth bandwidth.

11. The same object file (image data) that is indicated by link data in step 3 and 6 is detected during rasterization in the fourth bandwidth of base data written in the top file of the highest layer. The continuing data of the object file data laid out by the procedure in step 6 is requested and the file is read, then rasterization continues.

12. As soon as rasterization of the first object file is finished, reading ends, and the transfer channel is released. Also, rasterization in the fourth bandwidth of the original base data written in the top file of the highest layer continues.

13. The same object file indicated by link data in step 8 is detected during rasterization in the fourth bandwidth of base data written in the top file of the highest layer. The continuing data of the object file data laid out by the procedure in step 6 is requested and the file is read, then rasterization continues.

14. As soon as rasterization of the second object file is finished, reading ends, and the transfer channel is released. Also, rasterization in the fourth bandwidth of the original base data written in the top file of the highest layer continues.

15. The base data written in the top file of the highest layer is rasterized in the fifth bandwidth.

16. The base data written in the top file of the highest layer is rasterized in the sixth bandwidth.

When there is a plurality of object files necessary for rasterization in one band processing unit, the text/image-formation apparatus theoretically performs transfer requests in parallel to transfer the plurality of objects. Therefore, theoretically by setting and assigning channels on the transmission path corresponding to each of the objects it becomes possible to transfer data independently, which has the effect of simplifying control.

It is also possible for the text/image-formation unit to control only one channel and request the transfer of a plurality of objects.

In the description above, the first data was path data indicating the location of the top file T (main XHTML data), however, it is also possible to send the data of the top file (main XHTML data) to the printer from the text/image-supply apparatus from the beginning, and then to sequentially request the necessary object file data.

After the procedure described above has been repeated and transfer of all of the objects required by the printing request ends properly, rasterization ends, and after the data has been printed on the recording medium, the data-transfer-request unit 2053 sends an end notification to the printer-control unit 103 of the STB 1000 together with the job ID. The printer-control unit 103 that received the printing end notification deletes from the printing buffer 105 the printing-description data (top file) of that job ID together with the object files that are linked to it, which were stored in the printing buffer 105.

(Also, in the case that a sub-directory is created that relates the job ID to a job, and all of the files (including the top file) that are necessary for that job are stored together in that sub-directory, the text/image-supply apparatus receives the printing end data and the printer-control unit 103 deletes that sub-directory at one time.)

Instead of the receiving an end notification from the printer, deletion of data from the printing bugger 105 can also be performed by the text/image-supply apparatus sending an inquiry to the printer to detect whether or not it is possible to delete the data.

Also, when an error occurs in the printer during printing, the printing job must be deleted when necessary. For example, when there is a loss of power on the side of the printer during the printing process, the bus reset mode is set for the IEEE1394 and the printer-control unit 103 of the STB 1000 receives the bus reset and sends a notification that the connection with the printer has been lost. At the timing when the printer-control unit 103 detects that the connection with the printer has been lost, it can delete the job ID and printing-description data that are stored in the printing buffer.

Furthermore, to avoid having unnecessary data remain when an error in the system occurs, it is possible to have the STB 1000 delete the job data and printing-description data in the printing buffer 105 when the power to the STB 1000 goes from OFF to ON, or when a timer limit operates according to an arbitrarily set value.

As mentioned above, the printing system of this invention is such that when transferring printing-description data using a serial bus connection, control (stopping and re-starting transfer) is performed such that the data is transferred in a format that is readable by the image-formation apparatus, and data is transferred in specified amounts at a time that can be rasterized by the image-formation apparatus for each band unit.

By doing this, there is no need for a large printing-description data buffer on the side of the printer for spooling, and furthermore it becomes possible to get other data at the timing when it is necessary on the printer side for the printing-description data, and this is advantageous when performing the rasterization process.

Also, on the side of the text/image-supply apparatus only a job needs to be issued and there is no need to perform a queuing process, so it is possible to use the HDD or the like installed inside the apparatus as the spooling buffer.

In this embodiment, an example was given in which a BML file created by the contents supplier was converted in the STB to an XML file, however, it is possible to send the BML file from the STB to the printer according to a printing instruction from the user, and to convert the BML file to an XML file in the printer and then for the printer when necessary to PULL the link files stored in the HDD of the STB based on the XML file created in this printer.

Embodiment 4

Figure 12:
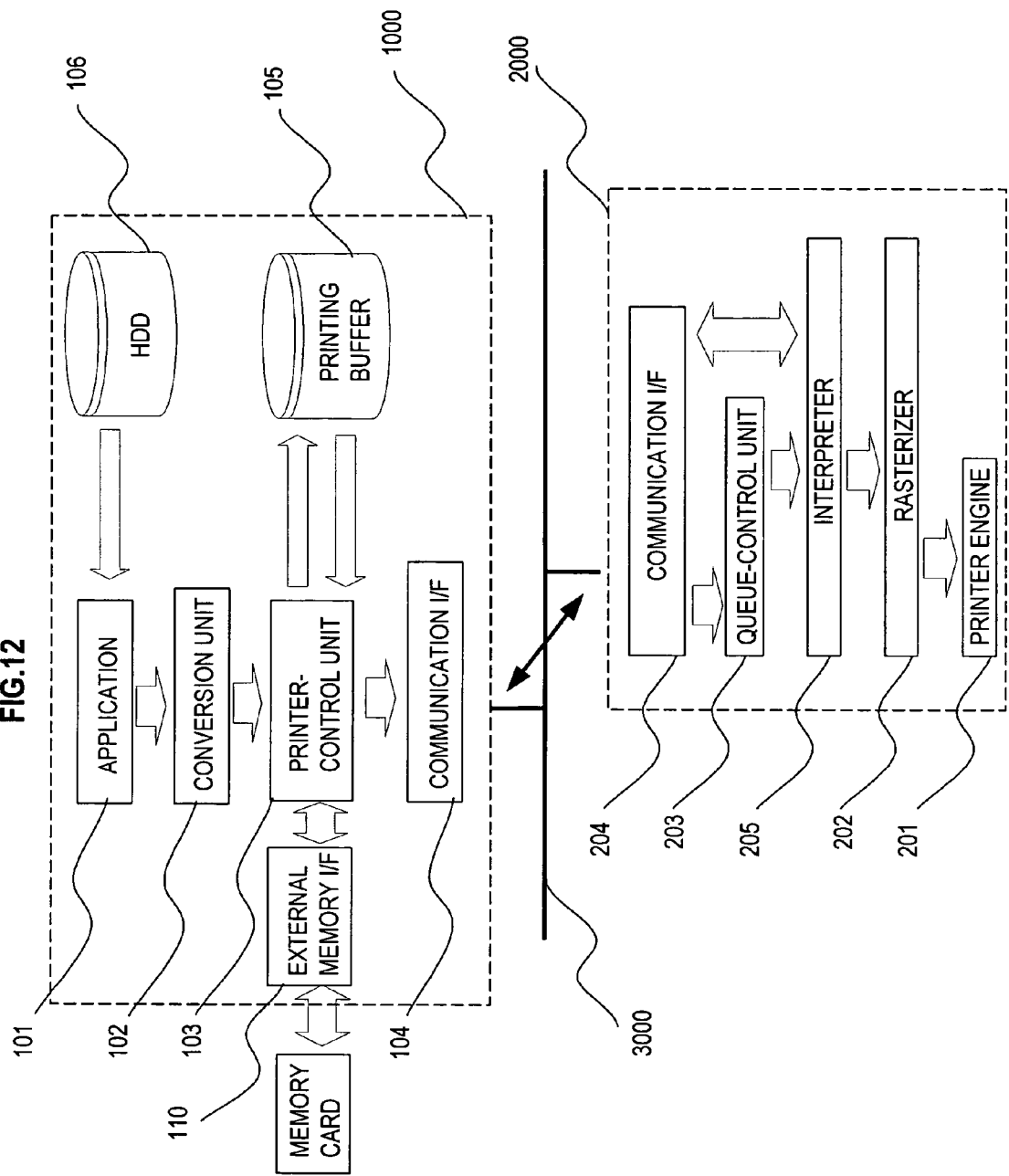
FIG. 12 is a block diagram showing the construction of the printing system of a fourth embodiment of the invention.

FIG. 12 is a functional block diagram showing a fourth embodiment of the invention. In this example, the STB 1000 and text/image-formation apparatus (printer) 200 are connected together by an IEEE1394 bus 3000, and the basic construction is the same as that of the third embodiment.

However, in this fourth embodiment, in addition to the basic construction of the third embodiment, the STB 1000 comprises an external memory unit MC (for example, a memory card; a memory card will be explained below) that has a mountable external memory I/F.

This external memory I/F 110 transfers the image data inside the memory card MC to the printer 2000 according to a request from the printer-control unit 103 of the STB 1000.

Here, when a memory card MC that stores images from a digital still camera is used as the memory card MC, an application 101 that can of course process data of a digital still camera (DSC) is used as the application 101.

For example, when using a memory card MC on which images from a digital still camera are stored, the user activates the application 101 and reads all of the images stored on the memory card MC. Instead of all of the images, it is also possible to display thumbnail images on the digital TV screen and then display only the necessary images on a selection screen such that they can be selected. The image to be printed is selected from among the read images, and the layout is further edited such that the image taken by a digital still camera is laid out in the desired form to be printed. After the user finishes editing using the application 101, the user then sends a printing instruction to the application, and the application generates printing-description data according to the edited contents and printing request. This generated file corresponds to the top file in embodiment 3. In this fourth embodiment the top file does not exist already as in the third embodiment, so it must be created, and it can be created by using either the STB application or printer application. When it is created by the printer, only data indicating which image was selected on the STB screen and which layout was selected is sent from the STB to the printer, and the top file is created based on this sent data. It is possible to put the link file in the top file directly from the memory card MC, or in order to perform processing similar to that of embodiment 3, it is possible to send all of the data from the memory card MC of the printer to the HDD 106 of the STB or printing buffer 105.

The printing-description data generated by this kind of application 101 is further converted by a conversion unit 102 to a language that can be read by the printer, for example, is converter to XHTML format, and the handled as the top file T for one printing request, and then stored in the memory unit of the text/image-supply apparatus having the configuration shown in FIG. 6.

In the third embodiment, the link destination of the link file L entered in the top file T is the printing buffer 105 as before, and when there is a printing request, the printing-description data edited using the application is stored in the printing buffer 105. Also, the object data (image data) linked to that printing-description data is laid out from the memory card MC in the printing buffer 105 as data that can be printed by the printer 2000.

However, when the object data stored in the memory card MC here is data that can be processed by the printer 2000 such as JPEG data, in this state, the link destination of the link file entered in the top file T can be a location that corresponds to the object data in the memory card.

In the case when the object data stored in the memory card is not data that can be printed by the printer 2000, the printer-control unit 103 can convert the data to data that can be printed by the printer 2000, and then transfer it to the printer 2000. Also, in the case when the printer-control unit 103 handles object data in the memory card that cannot be printed by the printer 2000, it can perform the following kind of processing. That is, it can store the object data in the printing buffer 105, and then when that data is to be transferred to the printer 2000, the printer-control unit 103 can convert that data to data that can be printed by the printer 2000 before transferring it to the printer 2000. It is also possible to store the data in the buffer 105 while (after) converting it.

However, when the data in the memory card MC are taken to be the link destination, the data is not deleted even when the printer sends a notification that printing has ended.

With the construction described above, as in the case of the third embodiment, it is possible to use an internal HDD as a spooling buffer, or is also possible to use an externally connected memory card or the like as is as a printing buffer. Moreover, it is enough for the text/image-supply apparatus to just create the top file of the printing-description data that includes the layout information.

In the case of the prior printer apparatus disclosed in Japanese patent 2000-66867, rasterization is performed after text and images have been laid out and combined in page units based on the data of the top file, and then output to a recording medium as a visible record. Therefore, similar to the disadvantage of the push-type method, it is necessary to have a printing buffer on the side of the printer that has a specified capacity (in this case, the capacity must be at least enough for the entire page), and thus cost limits occurred. However, with this invention, there is no need to have a large-capacity memory unit such as a hard disc on the side of the text/image-formation apparatus. Particularly, when processing text/image data containing a plurality of files, by having a channel for each file, it becomes easy to perform channel control for transferring data between the STP 1000 and printer 2000, and thus it is possible to obtain the effect of simplifying data processing between the STB 1000 and printer 2000.

Embodiment 5

Next, a fifth embodiment of the invention will be explained. In the embodiments described above, examples were giving of communication that used an IEEE1394 bus, however, here FIGS. 20 to 22 will be used to explain in detail the use of 'Bluetooth' (R) instead of an IEEE1394 bus.

Bluetooth is a name used for the currently standardized remote wireless technology, and the following explanation uses the terminology that is used by this Bluetooth standardization group, 'The Bluetooth Special Interest Group (SIG)'.

Figure 20:
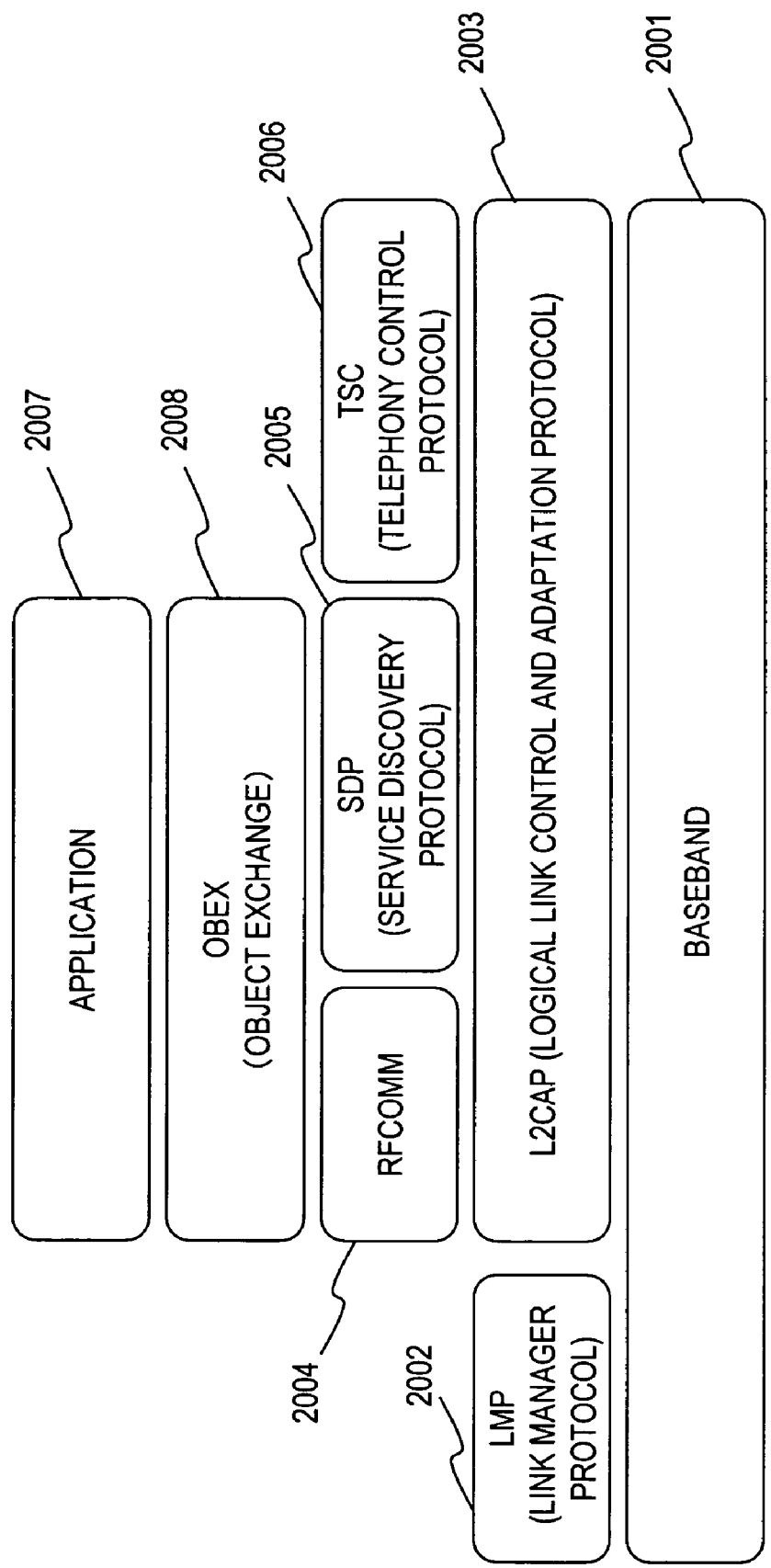
FIG. 20 is a diagram showing the Bluetooth protocol.
Figure 21:
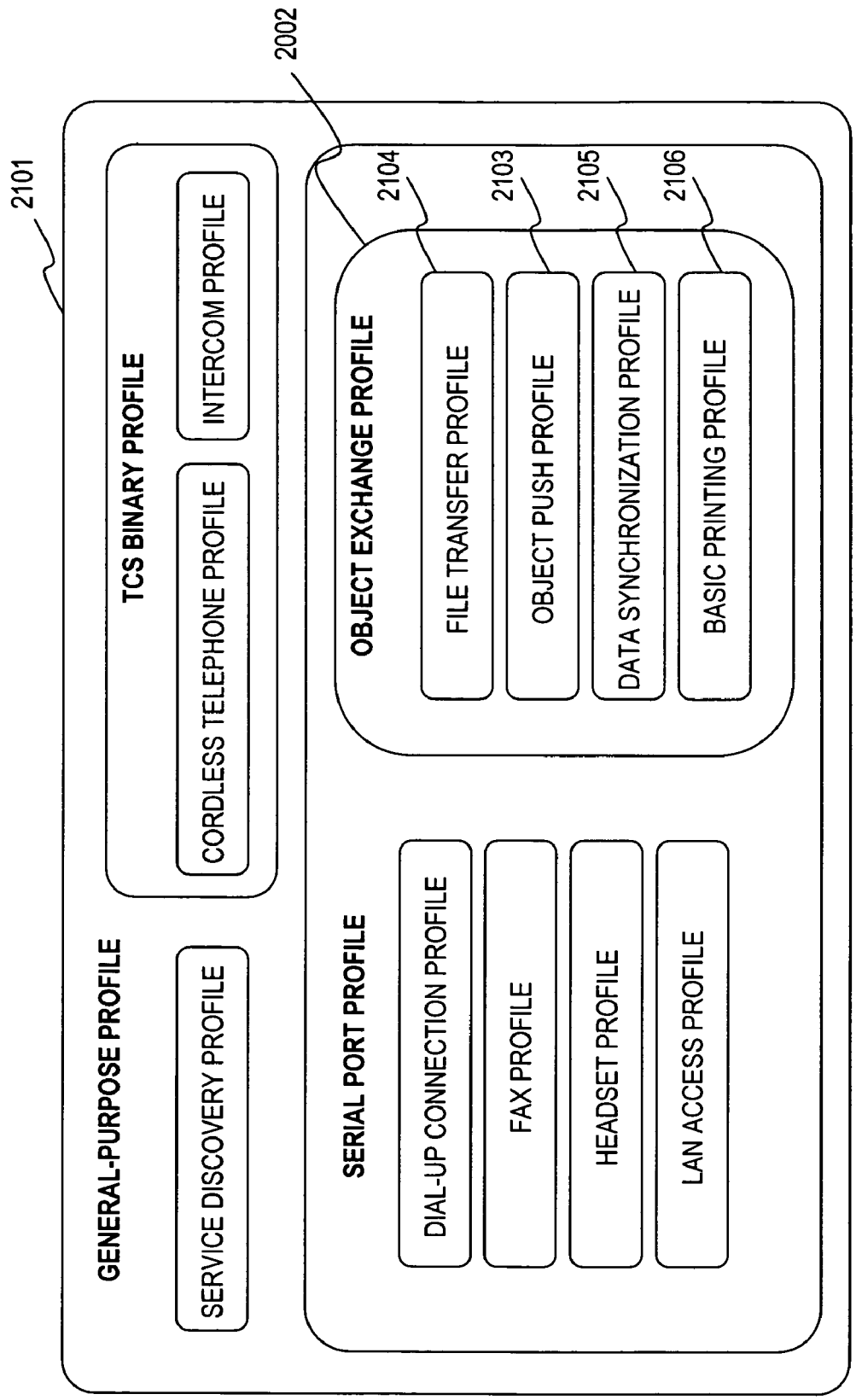
FIG. 21 is a diagram showing the profiles according to application in the Bluetooth protocol.

First, FIG. 20 is used to explain the Bluetooth protocol. In the Bluetooth standards, the baseband 2001, LMP (Link Manager Protocol) 2002, L2CAP (Logical Link Control and Adaptation Protocol) 2003, RFCOMM 2004, SDP (Service Discovery Protocol) 2005 and TCS (Telephony Control Protocol Specification Binary) 2006 are regulated.

Also, in the case of using Bluetooth, the application can perform communication using OBEX (Object Exchange) or TC/IP that is normally used in conventional communication technology. Furthermore, the Bluetooth standards regulate the types of profiles 2101 (for each application) shown in FIG. 21.

Of these profiles, in this fifth embodiment, the case of using the object exchange profile 2102 will be explained.

The general-purpose object exchange profile comprises all of the processes used with performing object (file) exchange, and depending on the type of exchange method, the 'Object Push Profile' 2103, the 'File Transfer Profile' 2104, the 'Synchronization Profile' 2105 or the 'Basic Printing Profile' (BPP) 2106 is used.

Figure 22:
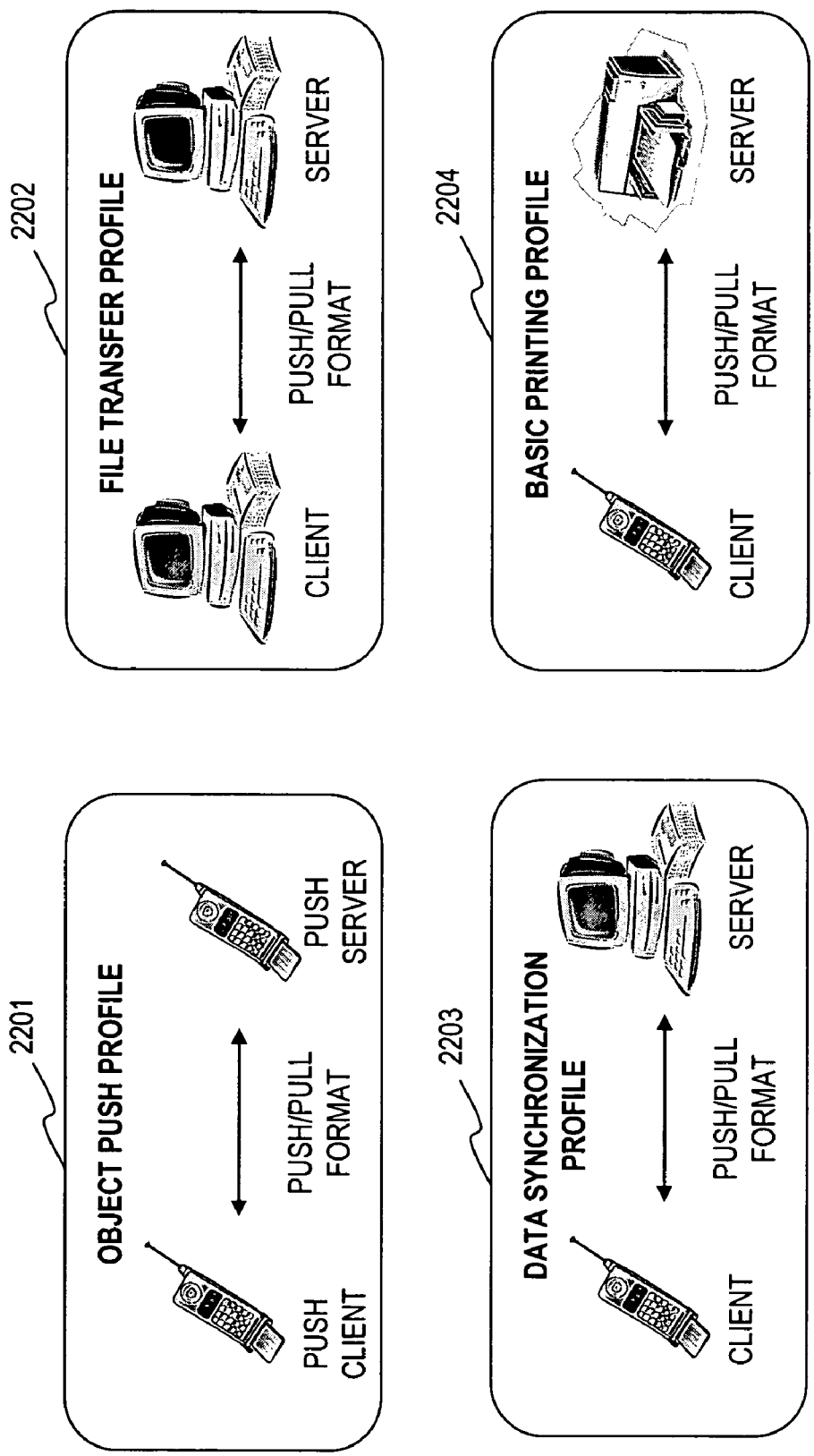
FIG. 22 is a diagram showing examples of applications for each profile.
Figure 23:
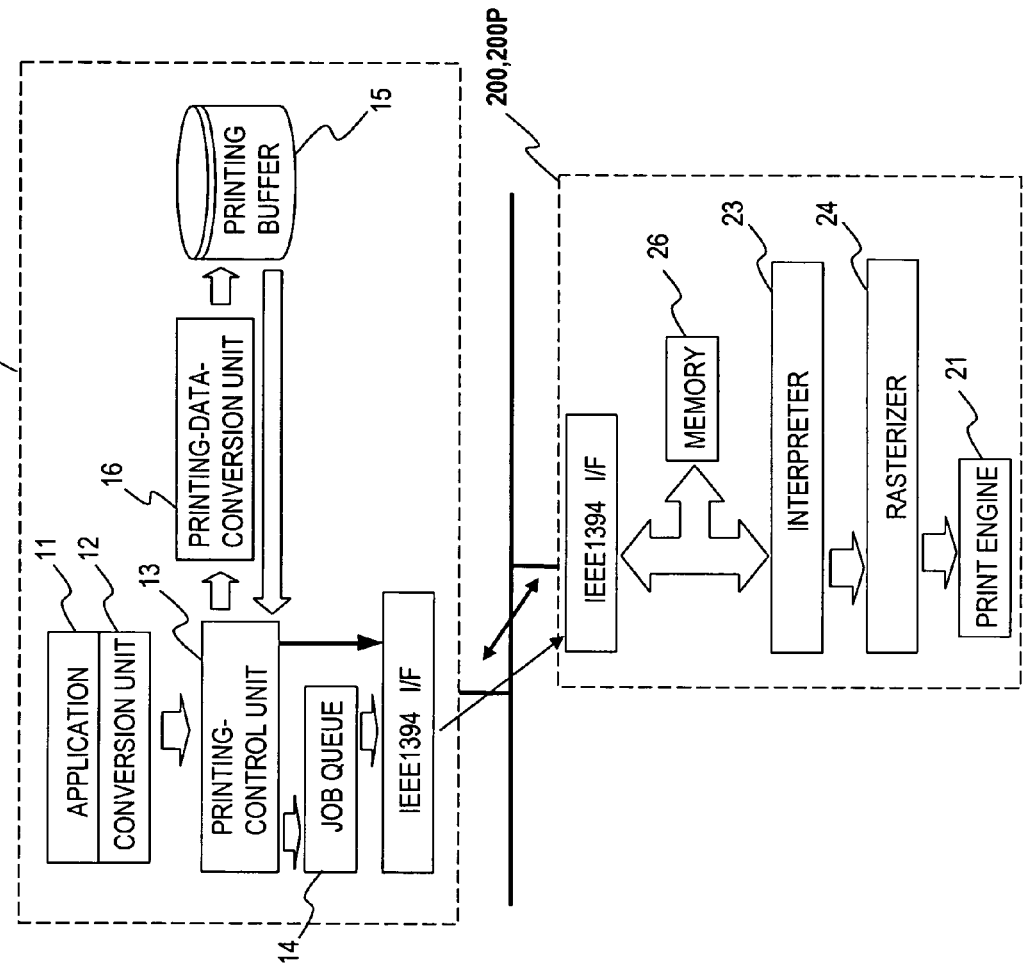
FIG. 23 is a schematic diagram showing a prior printing system.
Figure 24:
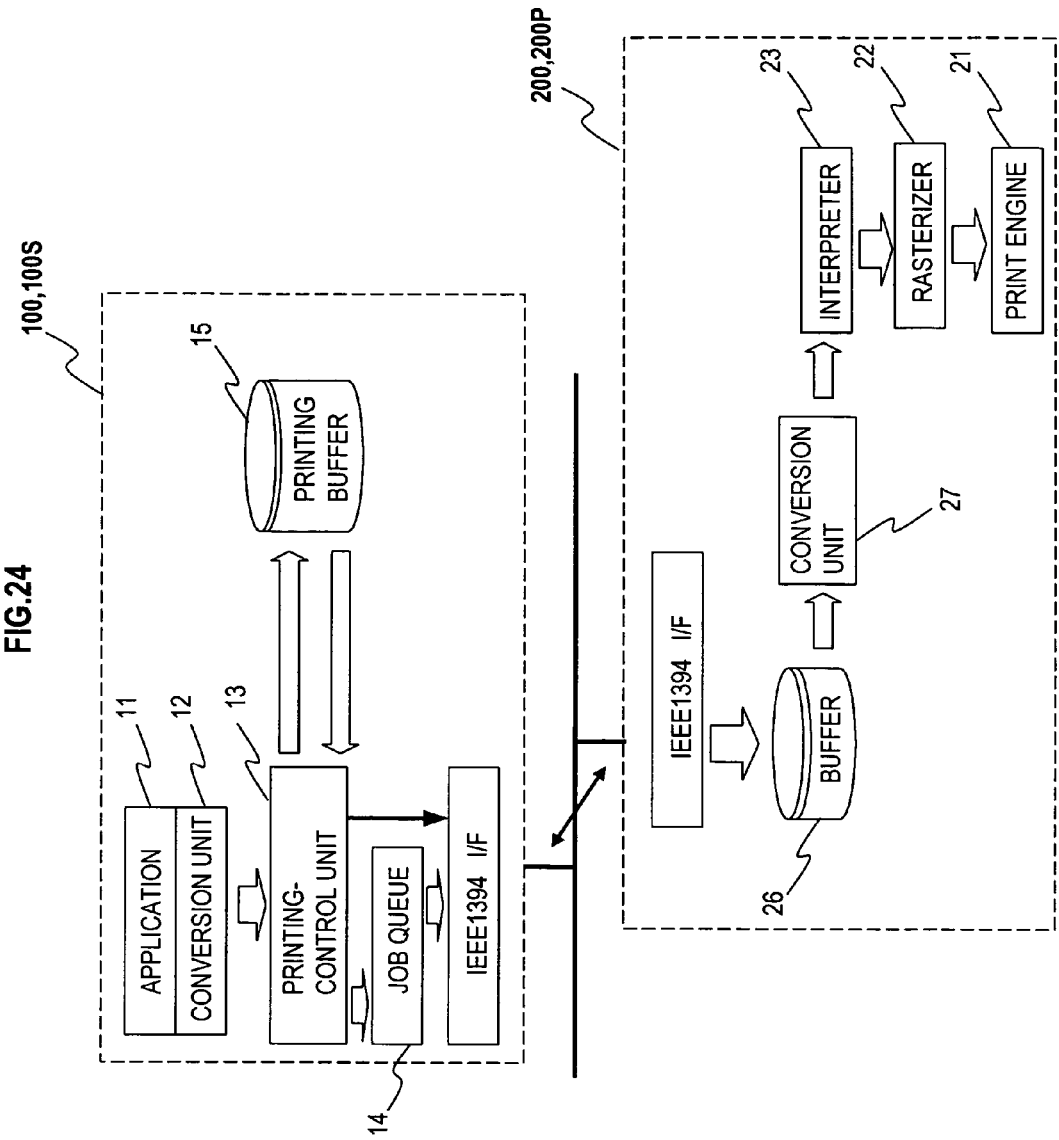
FIG. 24 is a schematic diagram showing another prior printing system.

Examples of using each profile are shown in FIG. 22. The object push profile 2103 is used when performing comparatively small sized object exchange (Push/Pull type) such as when exchanging name and address information using portable telephones (example 2201). The file transfer profile 2104 is used when transferring comparatively large files between personal computers (example 2202). The synchronization profile 2105 is used when realtime transfer of audio and video (data synchronization function) is necessary even when there is an asynchronous connection (example 2203). Also, the basic printing profile (BPP) 2106 in use together with the Object Exchange (OBEX) makes it possible for a PDA or portable telephone (a device without a printer port) to communicate with a printer without a printer driver (example 2204). By having an object exchange program, OBEX 2008, installed in the RFCOMM 2004, these make an asynchronous connection between a master and a slave possible.

Here, a more specific example of using the Basic Printing Profile 2106 of the object exchange profiles will be explained.

In the Basic Printing Profile 2106, there is a Simple Push Transfer Model and a Job Based Transfer Model. Each of these will be explained below.

In the Simple Push Transfer Model, the sending side (image-supply apparatus 100) uses PUT REQUEST according to the OBEX protocol to send the object to the receiving side (image-formation apparatus 200). In this model, neither job management nor the acquisition of status is performed the two sides.

When the image-supply apparatus 100 generates a printing request, the application uses the OBEX protocol Operation (=File Push) to send document data to the image-formation apparatus 200. At this time, the document data is included in one OBEX header, or in other words the Body Header.

Also in this model, when a referenced object such as image data is included the printing contents, the image-formation apparatus 200 has a mechanism that is capable of searching for image data from the image-supply apparatus 100 at the connection destination, and in that case, the image-formation apparatus 200 uses the GET REQUEST instruction or Operation (=Get Referenced Objects) in the OBEX protocol to perform a send request to the image-supply apparatus 100 to send the required referenced object. At this time, the image-formation apparatus 200 sets that the GET request is a referenced object in the Type Header, which is an OBEX header, sets URI in the Name Header, and sets the Offset and Count in the Application parameter header. The Offset indicates the amount of offset (bytes) with respect to the image or file data, and the Count indicates the amount (bytes) to be sent. The image-supply apparatus 100 receives the request and sets the image data requested by the image-formation apparatus 200 in the OBEX response Body Header as GET RESPONSE, and sends it to the image-formation apparatus 200.

Also, in the Job Based Transfer Model, communication is performed using the OBEX protocol in the same way as described above, however, it differs from the Simple Push Transfer Model, in that the job is generated and data transfer is performed based on the job ID. In the case of a message response for job management or status acquisition, the response is put in the form of a record with SOAP/XML format and exchanged.

When the document data itself is transferred, first, after the application of the image-supply apparatus 100 performs the job generation process using the OBEX protocol GET REQUEST or Operation (=Create Job), the image-supply apparatus 100 receives the Job ID included in the Application parameter header as the GET RESPONSE from the image-formation apparatus 200. Them the image-supply apparatus 100 uses the PUT REQUEST or Operation (=Send Document) to send the document data. At this time, the document type is set in the OBEX Type Header, and the printing data itself is set in the Body Header. Also in this case, as in the case of the Simple Push Transfer Model, when a referenced object such as image data is contained in the printing contents, the image-formation apparatus 200 has a mechanism that is capable of searching for the image data from the image-supply apparatus 100 at the connection destination, and in that case, the image-formation apparatus 200 uses the GET action or Operation (=Get Referenced Objects) according to the OBEX protocol to perform a send request to the image-supply apparatus 100 to send the required referenced object. At this time, the image-formation apparatus 200 sets that the GET request is referenced object in the Type Header OBEX header, sets URI in the Name Header, and sets the Offset and Count in the Application parameter header. The Offset indicates the offset amount (bytes) with respect to the image or file data, and the Count indicates the amount (bytes) to be sent. The image-supply apparatus 100 receives this request, then sets the image data requested by the image-formation apparatus 200 in the response OBEX Body Header as GET RESPONSE, and sends it to the image-formation apparatus 200.

Also, in the Simple Push Transfer Model, in addition to the application using the PUT REQUEST OBEX protocol or Operation (=File Push) to send the document data to the image-formation apparatus 200, the image-supply apparatus 100 uses the Operation (=Simple Reference Push) to set the URL for referencing the OBEX Body Header without sending the document data itself, and the image-formation apparatus 200 that receives it uses the OBEX protocol GET REQUEST or Operation (=Get Referenced Objects) based on the obtained reference URL to perform a send request to the image-supply apparatus 100 to send the required referenced document data.

Also, in the case of the Job Based Transfer Model, as in the case of the Simple Push Transfer Model, during processing of the Job Based Transfer Model, the image-supply apparatus 100 uses the PUT REQUEST or Operation (=Send Reference) instead of the Operation (=Send Document) to set a URL for referencing the OBEX Body Header without sending the document data itself, and then the image-formation apparatus 200 that received this, uses the OBEX protocol GET REQUEST or Operation (=Get Referenced Objects), and sends a send request to the image-supply apparatus 100 to send the required referenced document data based on the obtained reference URL.

As described above, in the case of using 'Bluetooth' as well, the image-formation apparatus 200 and acquired just a specified amount data from a specified part of the image data from the image-supply apparatus 100.

The invention claimed is:

1. A text/image data-transfer method used between a text/image-supply apparatus and text/image-formation apparatus that are connected by a communication means and that performs transfer based on layered printing-description data having a highest-level data and an image data file, the highest-level data including link information, text data, and information presenting a layout of a print object, the image data file being linked with the link information in the highest-level data, the method comprising:

a step of transferring data, which specifies the highest-level printing-description data, from said text/image-supply apparatus to said image-formation apparatus;

a step of sending a transfer request from said text/image formation apparatus to said text/image-supply apparatus based on data that specifies said highest-level printing-description data to transfer said highest-level printing-description data;

a step of transferring said highest-level printing-description data from said text/image-supply apparatus to said text/image-formation apparatus based on a said transfer request from said text/image-formation apparatus;

a step of the text/image formation apparatus requesting, from the text/image supply apparatus, a first portion of the image data file corresponding to link information, when said link information was detected by the text/image formation apparatus in said highest-level printing-description data, for a first rasterization process of said text/image-formation apparatus;

a step of rasterizing the first portion of the image data file corresponding to link information, for the first rasterization process;

a step of the text/image formation apparatus requesting, from the text/image supply apparatus, subsequent to the step of rasterizing the first portion of the image data file corresponding to the link information, a second portion of the image data file corresponding to the link information, for a second rasterization process of said text/image-formation apparatus; and a step of judging when all of a printing job corresponding to the highest-level printing-description data is finished or not, returning to the step of the acquiring a first portion of the image data file corresponding to the link information when all of the printing job is not finished, and sending a printing-complete notification to said text/image-supply apparatus when all of the printing job is finished.

2. The text/image data-transfer method of claim 1 wherein
said text/image-formation apparatus is operable to send a request to said text/image-supply apparatus to transfer data at arbitrary timing.

3. The text/image data-transfer method of claim 1 wherein
said text/image-formation apparatus is operable to send a request to said text/image-supply apparatus to transfer data at arbitrary timing, and said text/image-formation apparatus is operable to request in parallel that portions of a plurality of image data files corresponding to a number of links detected in the highest-level printing-description data by the text/image-formation apparatus be transferred from said text/image-supply apparatus, when sending a transfer request to transfer image data files necessary for said rasterization process.

4. The text/image data-transfer method of claim 1 wherein
said text/image-formation apparatus is operable to send a request to said text/image-supply apparatus to transfer data at arbitrary timing, said text/image-formation apparatus is operable to request in parallel that portions of a plurality of image data files corresponding to a number of links detected in the highest-level printing-description data by the text/image-formation apparatus be transferred from said text/image-supply apparatus, when sending a transfer request to transfer image data files necessary for said rasterization process, and said text/image-formation apparatus independently controls the data transfer process when transfer of said portions of the plurality of image data files are requested in parallel.

5. The text/image data-transfer method of claim 1 wherein
said text/image-formation apparatus specifies an arbitrary amount of data from an arbitrary position in the image data file and sends a request to said text/image-supply apparatus to transfer data.

6. The text/image data-transfer method of claim 1 wherein transfer of the image data file is performed one time or repeated a plurality of times until said arbitrary amount of data necessary for one rasterization process is obtained.

7. The text/image data transfer method of claim 1 wherein
said link information contains information specifying at least the storage location of the image data file stored by said text/image-supply apparatus.

8. The text/image data-transfer method of claim 1 wherein
said link information contains information specifying at least the storage location of the image data file stored by said text/image-supply apparatus, and said information specifying said storage location is path information.

9. The text/image data-transfer method of claim 1 wherein
said link information contains information specifying at least the storage location of the image data file stored by said text/image-supply apparatus, and said information specifying said storage location is a URI (Universal Resource Identifier).

10. The text/image data-transfer method of claim 1 wherein
said information that specifies said highest-level printing-description data is path information.

11. The text/image data-transfer method of claim 1 wherein
said information that specifies said highest-level printing-description data is a URI (Universal Resource Identifier).

12. The text/image data-transfer method of claim 1 wherein
said text/image-supply apparatus transfers an image data file according to a data-transfer request from said text/image-formation apparatus based on said link information.

* * * * *